United States Patent [19]

Henniger et al.

[11] 3,870,705

[45] Mar. 11, 1975

[54] 6-ISOCYANATOAMINOPENICILLANIC ACID DERIVATIVES AND PROCESS FOR PRODUCING THEM

[75] Inventors: Peter Wolfgang Henniger, Leiden; Peter Max Smid, Delft, both of Netherlands

[73] Assignee: Koninklijke Nederlandsche Gist-En Spiritusfabried N.V., Delft, Netherlands

[22] Filed: Jan. 25, 1972

[21] Appl. No.: 220,713

Related U.S. Application Data

[63] Continuation-in-part of Ser. No. 98,445, Dec. 15, 1970, Pat. No. 3,741,958, which is a continuation-in-part of Ser. Nos. 834,544, June 18, 1969, abandoned, and Ser. No. 98,462, Dec. 15, 1970, abandoned.

[30] Foreign Application Priority Data

Dec. 18, 1969 Great Britain .................... 61840/69

[52] U.S. Cl. ............ 260/239.1, 260/306.7, 424/271
[51] Int. Cl. ............................................ C07d 99/16
[58] Field of Search ...................... 260/239.1, 306.7

[56] References Cited

UNITED STATES PATENTS 3,652,546 3/1962 Cheney et al. .................. 260/239.1
3,657,224 4/1972 Heuser ........................... 260/239.1

*Primary Examiner*—Nicholas S. Rizzo
*Attorney, Agent, or Firm*—Hammond & Littel

[57] ABSTRACT

Novel derivatives of 6-isocyanatopenicillanic acid and 6-isothiocyanatopenicillanic acid, their preparation, their use as intermediates in producing penicillines and thiopenicillines.

14 Claims, No Drawings

6-ISOCYANATOAMINOPENICILLANIC ACID DERIVATIVES AND PROCESS FOR PRODUCING THEM

PRIOR APPLICATIONS

This application is a continuation-in-part application of co-pending, commonly assigned U.S. Pat. application Ser. No. 98,445 filed Dec. 15, 1970 now U.S. Pat. No. 3,741,958 which in turn is a continuation-in-part of application Ser. No. 834,544 filed June 18, 1969 now abandoned, and of co-pending, commonly assigned U.S. Pat. application Ser. No. 98,462 filed Dec. 15, 1970 now abandoned.

OBJECTS OF THE INVENTION

It is an object of the invention to provide novel 6-isocyanatopenicillanic acid and 6-isothiocyanatopenicillanic acid derivatives and their preparation.

It is further object of the invention to provide novel intermediates for producing penicillin and thiopenicillin derivatives.

It is another object of the invention to provide a novel process for the preparation of N-acyl derivatives of 6-amino-penicillanic acid.

These and other objects and advantages of the invention will become obvious from the following detailed description.

THE INVENTION

It has been found that useful new penicillanic acid derivatives, namely 6-isocyanatopenicillanic acid esters and 6-isothiocyanatopenicillanic acid and esters and salts thereof of the formula

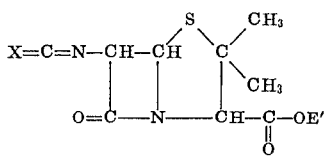

where X is selected from the group consisting of oxygen and sulfur and E' is a group, easily removable and replaceable by hydrogen to give a free carboxyl group, which does not interfere with the reaction, when X is oxygen and E' is selected from the group consisting of hydrogen, an amine, a $NH_4$, an alkali metal, and an alkaline earth metal group and a group easily removable and replaceable by hydrogen to give a free carboxyl group, which does not interfere with the reaction, when X is sulfur, are obtained by reacting phosgene or thiophosgene with a penicillanic acid derivative of the formula

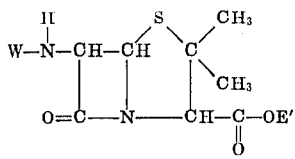

wherein W represents a hydrogen atom or an easily removable group, i.e. a group which is removed upon reaction with phosgene to yield an isocyanato or isothiocyanato group, and E' is defined as above to give a free carboxyl group, in an inert organic solvent, whereby the grouping W-NH- is converted into an isocyanato or isothiocyanatogroup without affecting the rest of the molecule. 6-isocyanatopenicillanic acid may be liberated from the ester by methods known per se only at very low temperatures. 6-isothiocyanatopenicillanic acid may be liberated from the ester at room temperature.

It has been discovered that a variety of 6-(substitutedamino) penicillanic acid compounds may be produced by reaction of 6-isocyanatopenicillanic acid esters or 6-isothiocyanatopenicillanic acid, and esters or salts thereof with reagents which enter into reaction with the isocyanato or isothiocyanato group without affecting the rest of the molecule.

DESCRIPTION OF THE PREFERRED EMBODIMENTS

According to the invention, the new compounds, 6-isocyanatopenicillanic acid, which is only stable at low temperatures or/and in solid state, or 6-isothiocyanatopenicillanic acid of formula I,

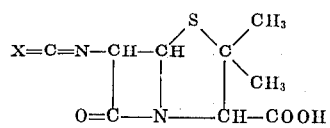

wherein X is oxygen or sulfur, are isolated and used as esters when X is oxygen and as esters, salts or the free acid, when X is sulfur. Such novel esters can be obtained by reaction with an alcohol, E—OH or transesterification with an ester E-Hal, wherein Hal represents a halogen, preferably a chloride atom, and E represents a group which, in general terms, should meet the following conditions.

a. Smooth introduction into the carboxylic group, i.e. introduction in such a way that undesired conversions such as opening of the β-lactam ring, of the penicillanic acid skeleton do not take place;

b. Ease of removal, thereby restoring the carboxylic function without affecting the penicillanic acid skeleton;

c. Satisfactory stability of the ester itself.

Suitable groups which meet the criteria set forth above and which E may thereby represent are, for instance:

A. various silyl groups such as e.g. those of the general formulas $(R)_3Si-$ or

wherein R represents a hydrocarbon radical such as lower alkyl, aryl (preferably phenyl) or aralkyl, preferably phenyl-lower alkyl group. Of all silyl groups, the trimethylsilyl group is presently considered to be most suitable. It should be further observed that silyl esters which are smoothly hydrolyzed, for instance by passing a stream of moist air through a solution wherein they are contained are preferably applied;

B. a phenacyl or halosubstituted phenacyl group, e.g. p-bromophenacyl, which can be removed by a substituted reaction with basic or nucleophilic agents;

C. a benzyl or benzhydryl group, which can be removed by hydrogenation.

The term "lower-alkyl" as used herein denotes an alkyl group having up to six carbon atoms.

The esters of 6-isocyanatopenicillanic acid or 6-isothiocyanatopenicillanic acid of formula II

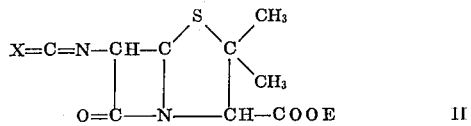

wherein E and X are as hereinafter defined can be obtained, according to the invention, by first converting 6-aminopenicillanic acid of formula III

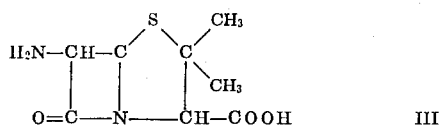

into an ester of general formula IV

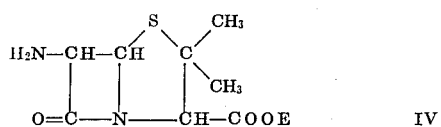

wherein E is as hereinafter defined.

The reaction is preferably carried out in an inert organic solvent medium and in the presence of an acid binding substance. Solvents such as aromatic hydrocarbons, especially toluene, are very well suited; for acid binding purposes an organic base such as a tertiary amine is preferably used.

According to the invention the ester of formula IV is then reacted with phosgene or thiophosgene in the presence of an inert organic reaction medium to yield the desired compound of formula II, and if desired liberating the 6-isothiocyanatopenicillanic acid from the resulting 6-isothiocyanatopenicillanic acid ester by methods known per se. Care should be taken to keep the sometimes violent reaction under control.

The 6-isothiocyanatopenicillanic acid thus obtained can be converted by methods known per se into, for example, alkali metal and alkaline earth metal salts, or reacted with an equimolecular quantity of an amine to form amine salts of the acid, the reaction preferably being carried out in an organic solvent, such as ethyl acetate. The said amine salts may be primary, secondary or tertiary amine salts derived from aliphatic, cycloaliphatic amines and heterocyclic amines, such as cyclohexylamine, dicyclohexylamine and N-ethylpiperidine salts.

According to a modification of the above process, an easily removable group W is introduced at the nitrogen atom of 6-aminopenicillanic acid concurrently with or after the esterification of the carboxylic acid group. For this purpose it is preferred to use, as group W, the group $(R)_3Si-$, wherein R is as hereinbefore defined. In those instances where E and W have the same analogous meaning, i.e. both representing tri(lower)alkylsilyl groups, the reaction conditions are suitably chosen in such a way that both groups E and W are introduced in the same process step. The subsequent reaction with phosgene or thiophosgene of the compounds formed by introducing substituent W, which compounds can be represented by the general formula V:

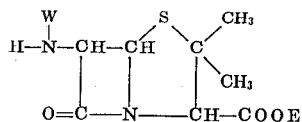

wherein E and W are as hereinabove defined proceeds much more smoothly, but under analogous conditions, than in the case where a compound of the general formula IV is used for the same purpose.

In an alternative and preferred method for obtaining 6-isothiocyanatopenicillanic acid compounds of formula II wherein E is phenacyl, benzyl or benzhydryl group, 6-isothiocyanatopenicillanic acid obtained by the aforesaid process in solution in acetone and water neutralized with sodium bicarbonate is reacted with a phenacyl halide to give the phenacyl ester of the acid, or 6-isothiocyanatopenicillanic acid is reacted with phenyldiazomethane or diphenyldiazomethane in ethereal solution to give the benzyl and benzhydryl esters of the acid respectively.

In the preparation of a compound of formula II, special attention should be paid to the reaction conditions in view of both the sensitivity of 6-aminopenicillanic acid towards various influences, such as acidic or alkaline medium, high temperatures, etc. and also the reactivity of the resulting isocyanate group. The reaction should be carried out in a dry, inert solvent medium. For this purpose toluene and methylene chloride or mixtures thereof are particularly suited. Moreover, to facilitate the reaction, an organic base can be added to bind the hydrogen chloride formed. Preferably this base is a tertiary amine, such as triethylamine or N-ethyl-piperidine, which does not react with the isocyanate function under the reaction conditions and the hydrochloride thereof precipitates rather than dissolves in the solvent used. When the reactant of formula V has a trialkylsilyl substituent on the 6-amino group, secondary or primary amines, for example, aniline, are also suitable agents for binding the hydrogen chloride formed in the reaction with thiophosgene as such amines do not react with the isothiocyanate group under the reaction conditions used.

The current methods of preparing isocyanates or isothiocyanates employ elevated temperatures to accomplish the formation of the isocyanato group $-N=C=O$ or isothiocyanato group $-N=C=S$ but, such a procedure would lead to decomposition of 6-aminopenicillanic acid and consequently makes it unsuited for the present purpose. According to a further feature of the invention, the esters of 6-aminopenicillanic acid of formula IV and V can be converted into the corresponding 6-isocyanatopenicillanic acid or 6-isothiocyanatopenicillanic acid esters of the formula II at very low temperatures, using the method described hereinabove. Destruction of the bicyclic nucleus is thereby completely or substantially completely prevented. Temperatures of $-20°C$. and preferably $-40°C$. are used with advantage.

Starting from the penicillanic acid esters of formula II, a great variety of penicillines can be prepared, using the well-known reactivity of the $-N=C=O$ or —N=C=S groups. These groups can enter into reaction with compounds having a Z—H function wherein Z represents a hetero atom such as O, S, N. When the reactant is not sufficiently active, or alternatively the sensitivity of the isocyanate used would require the reaction to be carried out at low temperatures, the appropriate compounds can be converted into Z-metal compounds. It is also known that an isocyanate is able to react with compounds having an active C—H bond, such as is present in the vinyl —HC=CH$_2$ bond. To activate the reactant, catalytic amounts of certain strong bases such as sodium methylate can be added. The reactant may also be converted quantitatively into an organometallic compound having the desired C-metal bond. A related reaction is that of a Grignard reagent with an isocyanate functional group.

Among the penicillins that can be obtained according to still a further feature of the invention, those of formula VI are of special interest:

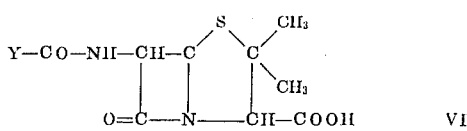

VI in this formula Y represents (a)    

wherein R$_1$ is an optionally substituted hydrocarbon group; including optionally substituted alkyl groups and aryl groups, such as phenyl; halophenyl; alkoxyphenyl; naphtyl and alkoxynaphtyl groups and aralkyl groups, such as a benzyl group, R$_2$ is a hydrogen atom, halogen atom, —CN group, NH$_2$ group, —CO—NH$_2$ group, —NH—COOY' group, COOY' group or OY' group, wherein Y' is a lower alkyl, aralkyl, preferably a benzyl group or aryl, preferably phenyl group or a silylgroup of the formulas (R)$_3$Si— and

, wherein R is as hereinbefore defined and R$_3$ is a hydrogen atom or a lower alkyl or aryl, preferably phenyl group.

Examples of such groups R$_1$R$_2$R$_3$C— are e.g.

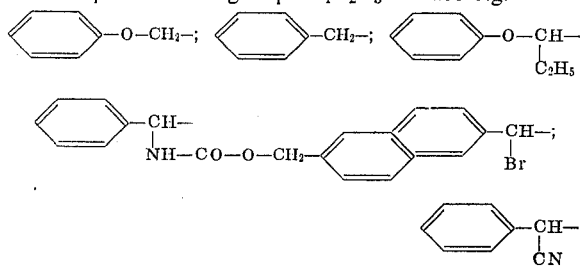

The introduction of the group Y can be effected by reacting a compound Y—CO—OH, wherein Y is as hereinabove defined and wherein substituents, which can react or can be influenced under the reaction conditions, are protected, with a compound of formula II. The reaction is preferably carried out in an inert organic solvent medium such as toluene. A small amount of an organic base such as pyridine may serve as catalyst. The reaction proceeds according the following scheme:

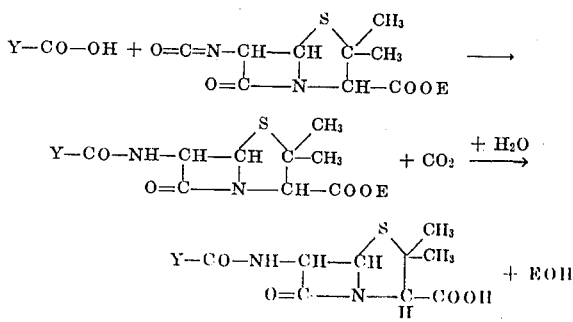

Alternatively Y may be introduced by conversion of penicillanic acid derivatives of formula II with a metal organic compound Y—Me$^I$, Y—Me$^{II}$—Hal or Y—Me$^{II}$—Y, wherein Y is as hereinbefore defined, Me is a metal atom having the valence indicated by the Roman numerals and Hal representing a halogen, preferably a chlorine or bromine atom. The reaction is carried out in an anhydrous solvent medium under conditions favoring a reaction of the Grignard, Reformatzsky or analogous type.

In the examples introduced to further elucidate the invention, it is clearly demonstrated that reaction of 6-isocyanato penicillanic acid derivatives of formula II with carbanionlike reactants of the type Y—Me$^I$, Y—Me$^{II}$—Hal or Y—Me$^{II}$—Y can be carried out to produce and then isolate substantial amounts of penicilines which were hitherto unknown or difficulty attainable. These compounds are rendered easily accessible according to the invention when the reactivity of the isocyanate function is appropriately used under suitable conditions. It has been demonstrated that the isocyanate function, depending on conditions is much more reactive than at least three other points of attack (the β-lactam ring, the group —COOE and the part —C—S—C in the thiazole ring) in the bicyclic system of penicillanic acid, known to be highly sensitive towards such carbanion-like reactants. This alternative method may advantageously be applied in such instances where a carboxylic acid, Y—COOH required for the more commonly used method is less accessible, than compounds Y—H or Y—Hal.

In formula VI, Y- may also be:

(b)    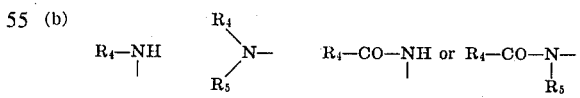

wherein R$_4$ represents: a lower alkyl group having not more than 6 carbon atoms; an isocyclic group having not more than 8 carbon atoms; an aryl especially phenyl or naphtyl group that may carry one or more of the following substituents: alkoxy, hydroxy and carboxy; or a group of the formula

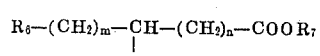

wherein R₆ represents a hydrogen atom or an aryl, preferably phenyl group, $n$ and $m$ are integers each ranging from 0 to 4 and R₇ is a lower alkyl group or hydrogen or R₄ is penicillanyl. R₅ represents a lower alkyl group. Alternatively R₄ and R₅ together with N form a heterocyclic nucleus such as a benzimidozolyl or piperidyl nucleus. Among suitable compounds that may be used are 1- or 2-naphthylamine, aniline, N-methylaniline, o-methoxyaniline, p-aminosalicyclic acid, anthranilic acid, D-phenylglycine, ethyl glycinate, butylamine, cyclohexylamine, 6-aminopenicillanic acid or esters thereof and benzimidazole.

In the reaction of a compound of the general formula II wherein X is oxygen, with an amine or acid amide as hereinbefore defined, the amine or amide may be used in the more active form of a metal, preferably sodium or lithium salt. The reaction is preferably carried out in an inert organic solvent medium such as benzene or toluene, under anhydrous conditions, preferably in the presence of catalytic amounts of an organic base, such as pyridine. The products resulting from the reaction are ureidopenicillanic acids when an amine is used as reactant and acylureidopenicillanic acids if the reactant is an acid amide.

In formula VI, Y may also be, c. a group A-O wherein A represents an optionally substituted hydrocarbon radical such as an alkyl, particularly lower-alkyl, aryl such as phenyl or aralkyl group including aryl-lower-alkyl groups and alkyl amino groups and heterocyclic groups. Among the compounds represented by the hydroxylic reactant A-OH that can be used to produce such derivatives are benzyl alcohol, ethanol, phenol, p-methoxyphenol, p-bromophenol, morpholinoethanol and quinuclidinol. The products obtained belong to the class of 6-penicillanyl urethanes.

The reaction can be carried out without employment of a solvent for the reactants in those instances where A-OH has good solvent properties. If A-OH represents a phenol, an inert, anhydrous organic solvent such as toluene is preferably used. The reaction may be facilitated by the addition of a catalyst such as a dialkylstannidiacetate.

In formula VI, Y may also be (d) 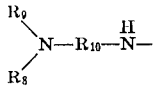

wherein R₁₀ is a lower alkylene group or an aryl-lower alkylene group and R₉ and R₈ may be the same or different and may be a lower alkyl group, lower alkylhydroxy group, R₉ and R₈ taken together with the nitrogen may be a heterocyclic group and R₉ may be hydrogen.

Compounds of this type may be prepared for example by reaction of a compound of formula II wherein X is oxygen with a polyamino compound such as 2-methylaminobenzylamine, 2-dimethylamino ethylamine and morpholinoethyl amine.

In formula VI, Y may also be e. a carboxy substituted alkyl, cycloalkyl or aryl group which group may also contain hetero substituents and heterocyclic rings such as the mercapto group and the indolyl group.

Compounds such as p-aminobenzoic acid, tryptophan and cysteine and 1-aminopentane carboxylic acid yield carboxysubstituted alkyl and aryl 6-ureidopenicillanic acids of the type just described when reacted with a compound of formula II, wherein X ix oxygen.

The above noted amino acids are, of course, used in the form of a suitable derivative such as the O,N-di(trimethylsilyl)compounds.

f. An aryl nucleus optionally substituted with at least one lower alkyl, lower alkoxy, such as alkoxynaphtyl. These compounds are prepared by reaction of compounds of the formula Y—Me', Y—Me''—Hal or Y—Me''—Y, wherein Y is as defined under f. and Me and Hal are as hereinbefore defined.

From the 6-isothiocyanatopenicillanic acid or the esters of formula II and salts thereof, e.g. amine salts, a great variety of thiopenicillins can be prepared using the well-known reactivity of the isothiocyanato group. This group can, for example, enter into reaction with amino compounds or compounds with a hydroxyl group.

Thus, in another feature of the invention, 6-substituted amino-penicillanic acid compounds are prepared by converting the isothiocyanato radical of 6-isothiocyanatopenicillanic acid, or salts thereof and esters of formula II into a substituted amino group by methods known per se which do not affect the rest of the molecule, and optionally removing the group E' by methods known per se from an ester of a 6-substituted aminothiopenicillanic acid so produced and, if desired, converting the resulting acid into a salt, e.g. alkali metal, alkaline earth metal or amine salt, thereof. By the term "methods known per se" is meant methods heretofore used or described in the chemical literature.

Among the thiopenicillins that can be obtained by this new process, thioureidopenicillins of the formula:

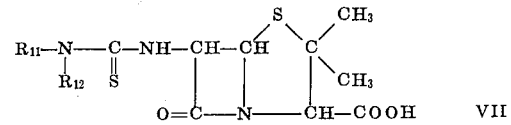

and esters and salts thereof, especially amine salts and alkali metal and alkaline earth metal salts, are of special interest. In this formula, R₁ is lower alkyl such as methyl, ethyl, propyl, n- or isobutyl, pentyl or hexyl, lower alkenyl such as allyl, aryl, such as phenyl or naphthyl, alicyclic such as cyclopentyl, cyclohexyl or cycloheptyl, aralkyl such as benzyl, phenethyl, 1-phenylethyl or phenylpropyl, heterocyclic linked through a carbon atom to the depicted nitrogen atom such as 2-piperidyl, 1-isoquinolyl, 2-pyridyl, 4-pyridyl or 3-morpholyl, substituted amino such as 1-piperidyl, 3-aminoquinolyl, 1-aminoisoquinolyl, adenyl, 4-aminomorpholyl, a 6-aminopenicillanyl ester, phenylamino, acetylamino or benzenesulphonylamino, and R₁₂ is hydrogen or lower alkyl group, or R₁₁ and R₁₂ together with the nitrogen atom to which they are attached form a mononuclear heterocyclic group, preferably with 5 or 6 atoms in the ring, e.g. piperidino or morpholino. The above mentioned groups within the definition of R₁₁ can have one or more substituents selected from the group consisting of halogen, lower alkyl, lower alkoxy, hydroxy and esterified carboxyl groups, or include carbonyl groups. The thioureidopenicillins of formula VII can be prepared by reacting 6-isothiocyanatopenicillanic acid, salts thereof and esters of formula II with an amine of the formula $R_{11}R_{12}NH$, wherein $R_{11}$ and $R_{12}$ are as defined above and if desired converting the resulting thioureidopenicillin ester by methods known per se into the corresponding free acid or a salt thereof, or a different ester. Examples of suitable amine reactants are 1- or 2-naphthylamine, benzylamine, aniline, N-methylaniline, 2-methoxyaniline, butylamine, 2,2-diethoxyethylamine, allylamine, cyclohexylamine, 6-aminopenicillanic acid or an ester thereof, or a protected amino acid such as ethyl glycinate. The reaction is preferably carried out in an inert organic solvent medium, for example ethyl acetate or acetone, under anhydrous conditions. Addition of strongly basic substances such as sodium hydroxide or certain aliphatic amines to the reaction mixture causes epimerisation of the 6-isothiocyanatopenicillanic acid ester at the 6-position carbon atom. In the special case of a primary or secondary aliphatic amine, a further reaction with the isothiocyanato group at the epimerised $C_6$ carbon atom may occur resulting in the formation of isomeric thioureidopenicillins. However, with most aliphatic amine reactants the $C_6$-epimerisation only occurs to a minor extent and cannot compete with the rather fast addition of the amine to the isothiocyanato group.

It is also possible to react the 6-isothiocyanatopenicillanic esters of formula II, the free acids or the salts derived therefrom, with other types of amines such as hydrazines, hydrazides and sulphonylhydrazides.

The 6-isothiocyanatopenicillanic acid esters of formula II, and the free acid and salts derived thereof, can be reacted with compounds having a hydroxyl group to give penicillin derivatives of the general formula:

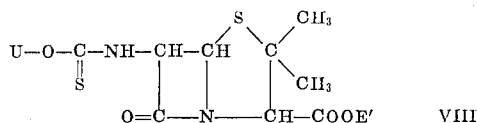

VIII wherein U is an optionally substituted hydrocarbon radical such as lower alkyl, e.g. methyl, n- or tert.-butyl, aralkyl, e.g. benzyl, or alicyclic, e.g. cyclohexyl group, and E' is as defined above.

Compounds of formula VIII can thus be prepared by reacting 6-isothiocyanatopenicillanic acid, salts or esters thereof with an alcohol in the presence of a catalyst. Examples of catalysts suitable for this purpose are Friedel Craft catalysts such as the aluminium trihalides, e.g. aluminium trichloride. Generally, only a small amount of catalyst is necessary. The reaction may be carried out in an organic solvent medium and in those cases where the alcohol reactant is a liquid under the reaction conditions, the alcohol itself may be used as the reaction medium. Preferably, an ester of the isothiocyanatopenicillanic acid is employed, for instance a silyl ester, such as the trimethylsilyl ester. The final product is obtained as the free acid or as the ester of the alcohol used as starting material. It is to be noted that with methanol and cyclohexanol, the corresponding esters are obtained, whereas with benzyl alcohol, n-butanol and tert.-butanol, the free acids are obtained. The reactions are preferably carried out at slightly elevated temperatures, but in some cases ambient temperatures may also be used.

The compounds which are obtained by reacting 6-isothiocyanato-penicillanic acid, salts or its esters with an alcohol show tautomerism as it is observed that at least in solution, an equilibrium exists between the tautomeric forms. This phenomenon is observed with the PMR spectra of solutions in different solvents. A further feature which indicates tautomerism is the fact that the compounds obtained as products are easily alkylated at the S atom, for instance, with diazoalkanes. By this alkylation, compounds having the following formula:

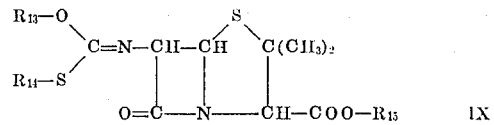

IX wherein $R_{13}$ and $R_{14}$ are the same or different and each is lower alkyl or aryl (lower) alkyl, alicyclic of 5 to 8 carbon atoms, and $R_{15}$ is selected from the group consisting of a group easily removable and replaceable by hydrogen, hydrogen and amine, $NH_4$, alkaline earth metal and alkaline metal groups, can be formed.

The formulae, which are given in Examples LVII to LXI in referring to the compounds obtained by the reaction of the isothiocyanates with alcohols, should therefore be considered in the light of possible tautomerism. The penicillanic acid derivatives of formulae VI, VII, VIII and IX wherein Y, U, $R_{11}$, $R_{12}$, $R_{13}$, $R_{14}$ are as hereinbefore defined, insofar as they are novel, have antibiotic properties which make them potentially useful as medicines for men and animals and as additives for animal feed.

They are preferably applied in the form of non-toxic salts such as alkali metal and alkaline earth metals i.e. sodium, potassium and calcium salts. Other salts that may be used in pharmaceutical preparations include the non-toxic suitably crystalline salts with organic bases such as amines like trialkylamines, procaine, dibenzlamine and the like.

When used for therapeutic purposes the compounds of the invention may be used as such or in the form of a pharmaceutical preparation customarily employed for the administration of therapeutically active substances, especially antibiotics. The invention includes within its scope pharmaceutical preparations containing, as the active ingedient, one of the novel penicillines of the invention. The present new penicillin compounds can be formulated in known pharmaceutical compositions employed for the administration of any of the pencillins in current use. For example, a capsule formulation that can be used for administering the present novel and active penicillin compounds is that employed for ampicillin which includes:

| | |
|---|---|
| one or more novel, 6-substituted penicillanic acid compounds of formula VI | 250 mg |
| $CaCO_3$ | 150 mg |
| CAB-O-Sil-M5 (an anhydrous, particulate colloidal silicate) | 5 mg |
| Sodium citrate, anhydrate | 20 mg |
| Magnesium stearate | 7.5 mg |
| AMBERLITE XE-88 (an ion exchange resin) | 5.0 mg |
| MICRO-CEL C(Finely divided, hydrated synthetic silicate) | 90 mg |

The preferred types of pharmaceutical preparation are those suitable for oral administration and especially capsules. Such capsules are preferably made of absorbable material, such as gelatin, and may contain the active substance attached to or incorporated in a carrier substance in such a way that the active substance is released over an extended period of time after ingestion. Liquid preparations may be in the form of solutions suitable for parenteral administration.

The novel method of the invention for combating bacterial infection in warm-blooded animals comprising administering to warm-blooded animals a safe and effective antibacterial amount of one of the novel penicillanic compounds of the invention.

The daily dosages for humans range from about 10 to 50 mg/kg and for veterinary use from about 5 to 25 mg/kg. In human as well as veterinary therapy these daily dosages may be divided into a 1–3 administrations given orally or parenterally.

The following examples are given to further illustrate the best mode currently contemplated for carrying out the present invention; however, they must not be construed as limiting the scope of the invention in any manner whatsoever.

The antibacterial in vitro results reported in the Examples were obtained by a serial dilution test as follows:

Two drops of a stock solution of the tested compound (antibiotic) in a known concentration are brought into the first hole of a test plate with 9 numbered holes by means of a sterile Pasteurpipette. After rinsing this pipette three times with a physiological NaCl solution, two drops of a stock solution of the testorganism in a culture medium, are brought in all holes, excepted the hole 8. In the first hole the solution of the tested compound has been half diluted. Then, by stirring the liquid in the first hole and adding two drops of this mixture to the second hole and so on until hole 8, dilutions of the tested compound solution are obtained in geometrical progression.

The hole 9 contains no antibiotic and serves for checking the growth of the testorganism in a blank medium. The test plate is incubated on 30° C. or 37° C. during about 18 hours. The minimal inhibitory concentration (MIC) is expressed in $\gamma/cc$, the least amount of antibiotic that completely inhibits the testorganism.

EXAMPLE I

A. preparation of a solution of the trimethylsilyl ester of 6-isocyanatopenicillanic acid in toluene from the trimethylsilylester of 6-N-trimethylsilylaminopenicillanic acid.

2 l of toluene and 150.5 g (697 mmoles) of 6-aminopenicillanic acid were placed in a 5 l three-necked flask equipped with stirrer, dropping-funnel, $P_2O_5$-tube and gas inlet tube, through which nitrogen is admitted. 220 ml (1579 mmoles) of triethylamine were added and over a period of about 20 minutes 250 ml (approximately 1980 mmoles) of trimethylchlorosilane were added dropwise. Stirring was continued. at room temperature for 2.5 hours after completion of the addition. Another portion of 1 l of toluene was added and the temperature was lowered to −60°C. Next, 90 ml (646 mmoles) of triethylamine and then, 112 ml (about 1.8 mol) of liquid phosgene were added while the temperature of the reaction mixture was kept below −40°C. Stirring was continued for 3 hours at −40°C. At this temperature, the precipitate formed was filtered off under nitrogen and washed with 500 ml of toluene. The greater part of the phosgene was removed from the combined filtrate and toluene washings by evaporation at −40°C. The temperature was then slowly raised to −20°C under reduced pressure. The remaining traces of phosgene, together with trimethylchlorosilane and triethylamine were removed while the temperature was allowed to slowly rise to +25°C and simultaneously most of the toluene was removed. During the evaporation procedure, the pressure was maintained between 0.5 and 1.5 mm Hg. The final volume of the solution is 750 ml, containing 263 mg/ml (yield: 80%) of the trimethylsilyl ester of 6-isocyanatopenicillanic acid. This solution was employed for the isolation of the said product in Example II and for the conversions described in Example V and ff.

B. Preparation of the trimethylsilylester of 6-isocyanatopenicillanic acid from trimethylsilylester of 6-aminopenicillanic acid. A solution of 60 mmoles of the trimethylsilylester of 6-aminopenicillanic acid in 250 ml. of toluene was slowly added dropwise under a nitrogen-atmosphere to a well-stirred mixture of 132 mmoles of triethylamine, approximately 150 mmoles of phosgene and 90 ml of toluene. During the addition, the temperature of the reaction mixture was kept below −40°C, and stirring was continued for 3 hours. The reaction mixture was then filtered under nitrogen at −40°C and the precipitate was washed twice with 60 ml of cold toluene. While the temperature was allowed to rise slowly from −40°C, the combined filtrates were evaporated under reduced pressure to a final volume of 70 ml. The solution contained 0.71 mmoles per ml of the trimethylsilylester of 6-isocyanatopenicillanic acid for a total yield of 49.7 mmoles (82%).

EXAMPLE II

Isolation of the trimethylsilylester of 6-isocyanatopenicillanic acid. 25 ml of the above-mentioned solution of the isocyanate in toluene prepared in Example 1A was concentrated under reduced pressure and with exclusion of moisture to a volume of about 10 ml and spontaneous crystallization occurred. 3 ml of anhydrous toluene were added and the crystalline product was vacuum filtered under nitrogen and washed twice with toluene. The crystals were freed from traces of toluene and stored in a nitrogen atmosphere to obtain about 4 g of the trimethylsilyl ester of 6-iso=cyanatopenicillanic acid and melting 85° − 88°C. and having a specific rotation $[\alpha]_D$ 20°=+163.3° in toluene. Mol. weight by mass spectroscopy; 314 (calculated 314)

ANALYSIS: (C,H, and N) for $C_{12}H_{18}N_2O_4SSi$;

| | calculated | FOUND |
|---|---|---|
| C | 45.86% | 45.92%(45.93 & 45.90%) |
| H | 5.73% | 5.78%(5.74 & 5.82%) |
| NZ | 8.92% | 8.87%(8.89 & 8.85%) |

The IR and PMR spectra in toluene (before isolation) and in carbon tetrachloride (after isolation) indicate the structure of the compound and the purity of the solution in toluene primarily obtained (greater than 95%).

The primarily obtained solutions in toluene can be stored for months at about 0°C without any appreciable decomposition. The solid is also stable for a considerable time provided the usual precautions for hygroscopic substances are taken. The solid readily dissolves in solvents such as diethylether or carbon tetrachloride.

Analysis of the PMR spectra of 6-isocyanatopenicillanic acid trimethylsilyl ester (taken at 60 Mc; δ values in ppm, using tetramethyl silane as internal standard);

| solvent (conc.) | Si(CH$_3$)$_3$ | CH$_3$ | C$_2$-H | C$_5$-H and C$_6$-H AB quartet; J=4.0 ± 0.2 cps | | | |
|---|---|---|---|---|---|---|---|
| toluene (about 240 mg/ml) | 0.20 | 1.33 1.40 | 4.41 | 4.07 | 4.13 | 5.06 | 5.13 |
| carbon tetrachloride (about 120 mg/ml | 0.32 | 1.54 1.67 | 4.42 | 4.73 | 4.80 | 5.47 | 5.53 |

Analysis of the IR spectrum of 6-isocyanatopenicillanic acid trimethylsilyl ester recorded in CCl$_4$ solution; conc.: about 10 mg/ml; values in cm$^{-1}$)

| N=C=O | C=O β-lactam | C=O ester | Si(CH$_3$)$_3$ | Si-O-C |
|---|---|---|---|---|
| 2255 | 1795 | 1728 | 1256,850 | 1028 | mmol/ml of the desired 6-isocyanatopenicillanic acid phenacyl ester.

The yield calculated from the benzenesulfonate of 6-aminopenicillanic acid-phenacyl ester was 71%. The structure of this isocyanate was established by IR and PMR spectra of its solution in toluene.

Upon concentration of the solution in vacuo, an almost pure product was obtained after precipitation of a crystalline by-product. The solution was filtered under nitrogen and evaporated to near-dryness leaving an almost colorless oily residue which was difficult to crystallize. The IR spectrum of this oil (in carbon tetra-

| solvent (conc.) | CH$_3$ | | C$_2$-H | C$_5$-H and C$_6$-H AB-quartet; J=4,0 ± 0,2 cps. | | CH$_2$(in ester group) AB-quartet; J=16.5 ± 0.5 cps | |
|---|---|---|---|---|---|---|---|
| toluene (about 155 mg/ml) | 1.48 | 1.57 | 4.59 | 4.05, 5.04, | 4.11, 5.10 | 4.57, 4.93, | 4.85 5.21 |
| carbon tetrachloride (about 60 mg/ml) | 1.66 | 1.72 | 4.55 | 4.74, 5.46 | 4.81 5.53 | 5.04 5.38, | 5.32 5.66 |

EXAMPLE III

Preparation of a solution of phenacyl ester of 6-isocyanato-penicillanic acid in toluene. As starting material the benzenesulfonate of 6-aminopenicillanic acid-phenacyl ester was used which was obtained in the usual way from 6-amino-penicillanic acid and phenacyl bromide (P. Bamberg et al., Acta Chem. Scand. 21 (1967) 2210). 17.22 g of this product (35 mmoles) were suspended in 100 ml of ice-water and 250 ml of ethyl acetate. With stirring, the pH was adjusted to 8.0 with 4N NaOH and the water layer was decanted and extracted with one 50 ml portion of ethyl acetate. The combined ethyl acetate — extracts were washed twice with 50 ml of cold water. The organic layer was briefly dried with calcium sulphate and filtered. 250 ml of anhydrous toluene were added to the filtrate and the solution was concentrated at room temperature to a volume of about 200 ml.

The concentrate was added dropwise but as rapidly as possible under vigorous stirring and in a nitrogen atmosphere to a mixture of 100 ml of toluene, 5.8 ml (about 90 mmoles) of phosgene and 12 ml of triethylamine (86mmoles), 1 ml of trimethylchlorosilane being employed as water binding agent. Stirring was continued for 3 hours at −40°C. Working up was as described in Example I. The volume of the final solution was 60 ml. This not completely pure solution contained 0.416 chloride) showed the expected absorption bands. Analysis of the PMR spectra of 6-isocyanato-penicillanic acid phenacyl ester (taken at 60 Mc; δvalues in ppm, using tetramethylsilane as internal standard).

In the spectra the C$_6$H$_5$ group was represented between about 7.2 and 8 ppm.

Analysis of the IR spectrum of 6-isocyanato-penicillanic acid phenacyl ester (taken in CCl$_4$; conc.: 10 mg/ml; values in cm$^{-1}$: 2260 (N=C=O), 1795 (C=O β-lactam) 1759 (probably C=O of the ester group), 1710 (probably C=O of the phenacyl group).

The primarily obtained solution of the phenacylester of 6-isocyanato-penicillanic acid in toluene was used for the reaction of Example IV.

EXAMPLE IV

Phenoxymethyl penicillin (penicillin V). A drop of pyridine and 632 mg (4.16 mmoles) of phenoxy-acetic acid were added with stirring to a solution of 4.16 mmoles of 6-isocyanatopenicillanic acid phenacyl ester in 10 ml of toluene while passing nitrogen through the solution. After 6 hours of stirring at room temperature, toluene was removed from the reaction mixture by evaporation under reduced pressure. 8 ml of purified dimethylformamide were added to the residue, 615 mg (4.16 mmoles) of potassium thiophenoxide dissolved in 2 ml of dimethylformamide were added to the solution. After 30 minutes stirring at room temperature and addition of 32 ml of acetone, a precipitate was filtered off, washed with acetone and dried under reduced pressure to obtain 820mg(50% yield) of chromatographically pure potassium salt of phenoxy-methyl-penicillin.

EXAMPLE V

Phenoxymethyl penicillin (penicillin V). 0.2 ml of pyridine and 1.81 g (11.9 mmoles) of phenoxy-acetic acid were added under a nitrogen atmosphere to 15 ml of a solution containing 11.9 mmoles of trimethylsilyl ester of 6-isocyanato-penicillanic acid in toluene. The mixture was allowed to react for 6 hours at room temperature. The volume of the reaction mixture was brought to 100 ml with ethyl acetate and 50 ml of water were added and the pH was adjusted to 2. The ethyl acetate layer was washed with water, dried and concentrated to a volume of 50 ml. Then 110 ml of ether were added dropwise and the precipitate formed was filtered off. The filtrate was treated with a solution of potassium ethylcapronate leading to the precipitation of the potassium salt of phenoxymethyl penicillin in a 60% yield.

EXAMPLE VI

%-Phenoxypropyl penicillin (propicillin). In an analogous way to Example V the reaction of 6-isocyanato-penicillanic acid-tri-methylsilyl ester and $\alpha$-phenoxybutyric acid was accomplished. At a pH of 6.5, the reaction product was taken up in the water layer. From this layer, the propicillin was removed by extraction with a mixture of ether and ethyl acetate (3:1). The organic layer was dried, concentrated and diluted with ether to which was added a solution of potassium ethylcapronate to cause a 25% yield of propicillin to precipitate.

EXAMPLE VII

Benzyl penicillin (penicillin G). 1.62 (11.9 mmoles) of phenyl acetic acid and 0.2 ml of pyridine were added to a solution of 11.9 mmoles of 6-isocyanato-penicillanic acid trimethylsilyl ester in toluene and the reaction mixture was allowed to react for 4.5 hours at room temperature. The volume therefore was brought to 100 ml with ethyl acetate and decomposition of the silyl ester was accomplished with 30 ml of ice-water and ice and acidification to a pH=2.5. Benzylpenicillin was obtained from the organic layer in known fashion to obtain a 35% yield.

EXAMPLE VIII $\alpha$-benzoxycarbonylamino benzyl penicillin. In an analogous way to example VII $\alpha$-benzoxycarbonylamino benzyl penicillin (carbobenzoxy-ampicillin) was obtained from 6-isocyanato-penicillanic acid-trimethylsilyl ester and $\alpha$-phenyl-N-benzoxy-carbonyl glycine in 50% yield. In a manner known, the carbobenzoxy group was split off by hydrogenation leaving $\alpha$-aminobenzyl penicillin.

EXAMPLE IX $\alpha$-bromobenzyl penicillin. Using the procedure of Example VIII, $\alpha$-bromobenzyl penicillin was obtained from 6-isocyanato-penicillanic acid trimethylsilyl ester and $\alpha$-bromophenyl acetic acid in 50% yield.

EXAMPLE X $\alpha$penicillin. In an analogous way to Example VII the reaction of equivalent amounts of 6-isocyanato-penicillanic acid-trimethylsilyl ester and $\alpha$-cyanophenyl acetic acid was accomplished. After the evolution of $CO_2$ had stopped, the reaction mixture was poured into ice-water. At a pH of 6.5, a toluene layer was separated by addition of ether. The water layer was extracted with methyl isobutyl ketone at a pH of 2.5. After washing with ice-water and drying, the organic layer is concentrated to some extent and treated with a small excess of cyclohexylamine till no further precipitation occurred. After filtration, the precipitate containing mainly N, N'-di(6)-penicillanylurea in addition to the desired penicillin, was triturated with methyl isobutyl ketone. This extract was added to the filtrate containing the major part of the cyclohexylamine salt of $\alpha$-cyanobenzyl-penicillin. By addition of methyl isobutyl ketone, the excess cyclohexylamine was removed under reduced pressure. Concentration of the solution led to precipitation of $\alpha$-cyanobenzyl-penicillin-cyclohexylamine salt in a 50% yield. The structure of this penicillin was established by IR and PMR spectra; the latter spectrum showed strong resemblance to that of $\alpha$-carboxy benzyl-penicillin (carbenicillin).

$\alpha$-Cyanobenzyl penicillin shows good antibacterial activity. In the PMR spectra of DL-$\alpha$-cyanobenzyl penicillin, the D-form and the L-form differ in chemical shift of the absorptions of C2-H, C$\alpha$-H and the $CH_3$-groups at $C_3$. $\delta$ Values in ppm (internal reference 2,2-dimethyl-2-silapentane-5-sulfonate) in the spectrum of a solution of the potassium salt in $D_2O$; $CH_3$: 1.50 and 1.45 (3 protons) and 1.50 (3-protons). $C_2$—H: 4.22 and 4.25. $C_\alpha$ —H: 4.67 (coincides with $H_2O$ abs.; the spectrum of the free acid in $CDCl_3$ shows two absorptions for C —H). $C_5$—H and $C_6$—H: 5.34–5.67 $C_6H_5$: 7.62 N-H: 7.2 $\Sigma$ 7.5.

EXAMPLE XI 6-(N'-1'-naphthyl-ureido) penicillanic acid (1'-naphthyl-ureido penicillin). 13.4 ml of a solution of 10 mmoles of 6-isocyanatopenicillanic acid-trimethylsilyl ester in toluene were added in a dry atmosphere at 35°C over a period of 10 minutes to 2.145 g (15 mmoles) of purified 1-naphthylamine and 2 drops of pyridine dissolved in 50 ml of toluene. The reaction was weakly exothermic and stirring was continued for 1 hour at 0°C. According to thin layer chromatography 90% of the isocyanate was converted to the desired ureidopenicillin-trimethylsilylester. Moist air was introduced into the solution and the ensuing viscous precipitate was washed with petroleum ether and dried. The precipitate (3.47 g) containing as the main impurity part of the excess of 1-naphthylamine, was dissolved in 65 ml of dry acetone and 11.3 mmoles of N-ethylpiperidine were added leading to 2.62 g (53% yield) of crystalline N-ethylpiperidine salt of 6-(N'-1'-naphthyl-ureido)-penicillanic acid of chromatographically pure compound. The structure of this ureidopenicillin was confirmed by its IR and PMR spectrum. Elementary analysis (C,H,N and S) for $C_{26}H_{34}N_4O_4S$;

| | CALCULATED | FOUND |
|---|---|---|
| O | 62.62% | 62.21% |
| H | 6.87% | 7.11% |
| N | 11.24% | 10.64% |
| S | 6.42% | 6.25% |
| O | 12.84% | (13.79%) |

PMR-spectrum of the potassium-salt dissolved in hexadeutero-dimethylsulfoxide ($\delta$values in ppm) $CH_3$:

1.57 and 1.64; $C_2$-H: 4.03; $C_5$-H and $C_6$-H: 5.42, 5.67. The IR spectrum (KBr-disk) of the N-ethylpiperidine salt shows inter al. the following carbonyl absorptions (cm$^{-1}$): 1772 ($\beta$-lactam), 1700 (C=O of the ureido group), 1595 (carboxylate).

EXAMPLE XII 6-(N'-2'-naphthylureido) penicillanic acid (2-naphthylureidopenicillin). In an analogous way to Example XI the N-ethylpiperidine salt of 6-(N'-2'-naphthyl-ureido) penicillanic acid was obtained in a 68% yield. This is a novel ureidopenicillin. Elementary analysis (C,H,N and S) for $C_{26}H_{34}N_4O_4S$:

|   | CALCULATED | FOUND |
|---|---|---|
| C | 62.62% | 62.22% |
| H | 6.87% | 7.08% |
| N | 11.24% | 10.66% |
| S | 6.42% | 6.42% |

The IR spectrum (KBr-disk) of the N-ethylpiperidine salt shows inter al. The following carbonyl absorptions (cm$^{-1}$): 1770 ($\beta$-lactam); 1700 (C=O of the ureido group), 1600 (carboxylate).

EXAMPLE XIII 6-(N'-phenylureido) penicillanic acid (phenylureidopenicillin). A solution of 0.01 mmole of 6-isocyanatopencillanic acid trimethylsilyl ester in 15 ml of toluene was added over a period of 10 minutes at 35° C while nitrogen was passed through to a solution of 1.1 ml (0.012 mmole) of purified aniline and 2 drops of pyridine in 50 ml of toluene. The reaction is exothermic. According to thin layer chromatography, the quantative conversion into the ureidopenicillin silyl ester was completed within 5 minutes of addition of the last portion of the isocyanate. The reaction mixture was cooled in an ice bath and moist air was then passed through for 2 hours. The precipitate was recovered by centrifugation and was successively washed with 3 portions of toluene and 2 portions of petroleum ether to obtain 2.6 g of desired product.

The mother liquid yielded another crop of 0.6 g for an overall yield of 3.2 g (theoretical yield: 3.3 g) of 6-(N'-phenyl-ureido)-penicillanic acid.

According to thin layer chromatography, the product contained no other penicillin-like components and showed the expected IR and PMR spectra.

1.4 g of crystalline N-ethyl-piperidine salt of 6-(N'-phenylureido) penicillanic acid was obtained by dissolving 1.6 g of the ureidopenicillin in acetone, and adding an equivalent of N-ethyl-piperidine to the solution. Elementary analysis (C,H, N, and S) for $C_{22}H_{32}N_4O_4S$:

|   | CALCULATED | FOUND |
|---|---|---|
| C | 58.91% | 58.51% |
| H | 7.19% | 7.36% |
| N | 12.49% | 12.42% |
| S | 7.13% | 7.03% |
| O | 14.28% | (14.68%) |

EXAMPLE XIV 6-(N'-o-methoxy-phenyl)-ureidopenicillanic acid. In a dry atmosphere, a solution of 10 mmoles of 6-isocyanato-penicillanic acid-trimethylsilyl ester in 13.6 ml of toluene was added dropwise over a period of 7 minutes at 35°C to a solution of 1.7 ml (15 mmoles) of o-methoxyaniline in 50 ml of anhydrous toluene. According to thin layer chromatography, the conversion of the isocyanate into the ureidopenicillin proceeded quantitatively. At 0°C, moist air was passed through the mixture and the precipitate was vacuum filtered and washed with petroleum ether. The precipitate was dried in a vacuum desiccator and amounted to 3.85 g. The precipitate was then dissolved in 60 ml of acetone and the solution was filtered. Addition of 1.41 ml of N-ethylpiperidine in 25 ml of acetone yielded 3.48 g of the N-ethylpiperidine salt of 6-(N'-o-methoxy-phenyl)-ureidopenicillanic acid. 1/2 $H_2O$. Concentration of the mother liquid yielded another 330 mg of pure product for a total yield of 78%. The product was identified through its IR and PMR spectra. Elementary analysis (C,H,N and S) for $C_{23}H_{34}N_4O_5$ S.1/2 $H_2O$:

|   | CALCULATED | FOUND |
|---|---|---|
| C | 56.67% | 56.70% |
| H | 7.14% | 7.24% |
| N | 11.49% | 11.09% |
| S | 6.57% | 6.29% |
| O | 18.13% | (18.68%) |

The IR spectrum (KBr-disk) of the N-ethylpiperidine salt shows inter al. the following carbonyl absorptions (cm$^{-1}$): 1763 ($\beta$-lactam), 1693 and 1673 (C=O of the ureido group), 1595 (carboxylate).

EXAMPLE XV

A. 6-(N'-3-hydroxy-4-carboxy phenyl-ureido) penicillanic acid. In an analogous way to Example XIV a solution of 16 mmoles of 0,0'-di (trimethylsilyl)-p-aminosalicylic acid in 70 ml of toluene was reacted in the presence of a catalytic amount of pyridine with a solution of 10 mmoles of 6-isocyanato-penicillanic acid-trimethylsilyl ester in 13 ml of toluene. After stirring for 10 hours at 35°C, the isocyanate was completely converted leading to the tri(trimethyl) silyl derivative of the ureido-penicillin which was obtained as a crude product in 80% yield. Working up was as described in Example XIV to obtain about 50% yield of amorphous (mono)N-ethylpiperidine salt of 6-(N'-3-hydroxy-4-carboxy-phenylureido-)penicillanic acid with more than 90% purity. The product was identified by its IR spectrum.

B. In an analogous way the trimethylsilyl esters and the triethylamine salts of anthranilic acid and D-phenylglycine were reacted with 6-isocyanato-penicillanic acid-trimethylsilyl ester to give the amorphous N-ethyl-piperidine salts of 6-(N'-o-carboxy-phenyl-ureido)penicillanic acid and of 6-(N'-$\alpha$-carboxybenzyl-ureido)-penicillanic acid, respectively. These three N'-substituted derivatives of 6-ureidopenicillanic acid are novel compounds.

C. 6-(N'-carbethoxy methylureido)-penicillanic acid. In an analogous way, a solution of 10 mmoles of 6-isocyanato-penicillanic acid-trimethylsilyl ester in 13 ml of toluene was added dropwise to a solution of 15 mmoles of glycine-ethyl ester in toluene at +35°C. After stirring for some hours at +35°C, the isocyanate, as shown by thin layer chromatography, was completely converted to two compounds of which the main component was the desired ureidopenicillin. The reaction product was worked up, as above to obtain 2.24 g of crystalline N-ethylpiperidine salt of 6-(N'-carbethoxymethyl ureido) penicillanic acid. The product is identified by its IR spectrum.

Elementary analysis (C,H,N and S) for $C_{20}H_{34}N_4O_6S$:

|   | CALCULATED | FOUND |
|---|---|---|
| C | 52.39% | 52.54% |
| H | 7.47% | 7.49% |
| N | 12.22% | 12.11% |
| S | 6.98% | 7.01% |
| O | 20.94% | (20.85%) |

In vitro tests with 6-(N'-α-carboxybenzylureido)-penicillanic acid was active against gram positive bacteria bacillus subtilis 6633 and staphylococcus aureus A 55 and A 321 at minimum inhibiting concentrations less than 2 γ per ml and against pasteus rettgeri A 821 and Proteus Spec H 3 at minimum inhibiting concentrations of about 68 per ml. Moreover, in toxicity studies in the mice, the said compound had an $LD_{50}$ greater than 1000 mg/kg administered intraperitonically which means that the compound is non-toxic to mice.

EXAMPLE XVI 6-(N'-n-butyl-ureido) penicillanic acid. In an analogous way to Example XIV a solution of 10 mmoles of the trimethylsilyl ester of 6-isocyanatopenicillanic acid in 60 ml of toluene was reacted with 21 mmoles of n-butylamine in the presence of a little pyridine. The exothermic reaction proceeded quantitatively to the trimethylsilyl ester of the desired ureidopenicillin. Moist air was passed through the mixture and 3.9 g of product was isolated. According to thin layer chromatography, the desired ureido-penicillin, probably in the form of its n-butylamine salt, was the sole product isolated. The product was dissolved in acetone and reacted with 20% excess of N-ethyl-piperidine to yield 1.8 g of crystalline N-ethyl-piperidine salt of 6-(N'-n-butyl-ureido) penicillanic acid.

Elementary analysis for $C_{20}H_{36}N_4O_4S$:

|   | CALCULATED | FOUND |
|---|---|---|
| C | 56.05% | 55.93% |
| H | 8.47% | 8.60% |
| N | 13.08% | 13.16% |
| S | 7.47% | 7.52% |
| O | 14.93% | (14.79%) |

EXAMPLE XVII 6-(N'-cyclohexyl-ureido) penicillanic acid. In the way as described in Example XVI, the trimethylsilyl ester of 6-iso-cyanato-penicillanic acid was reacted with cyclohexylamine to give practically quantitatively an amorphous substance which according to thin layer chromatography was a pure product. 1.8 g of this product was converted into 1.3 gm of the crystalline N-ethylpiperidine salt of 6-(N'-cyclohexyl-ureido) penicillanic acid.

Elementary analysis for $C_{22}H_{38}N_4O_4S$:

|   | CALCULATED | FOUND |
|---|---|---|
| C | 58.13% | 57.88% |
| H | 8.43% | 8.55% |
| N | 12.33% | 12.19% |
| S | 7.04% | 6.95% |
| O | 14.07% | (14.43%) |

EXAMPLE XVIII 6-(N'-6-penicillanyl-ureido) penicillanic acid.

Addition of the trimethylsilyl ester of 6-isocyanatopenicillanic acid to an equivalent amount of the trimethyl silyl ester of 6-amino-penicillanic acid in a toluene solution in the presence of a little pyridine at room temperature resulted in a crystalline precipitate in 50% yield which, according to thin layer chromatography, was in a pure state. This compound constituted the main component of the solution in toluene Identification of the di-(trimethylsilyl) ester of N'-6-penicillanyl-6-ureidopenicillanic acid was accomplished by recording its IR and PMR spectra. From this compound, the crystalline dicarboxylic acid was obtained as mono-etherate by acid hydrolysis.

Elementary analysis (N and S) for $O_{17}H_{22}N_4S_2O_7 \cdot (C_2H_5)_2 O$

|   | CALCULATED | FOUND |
|---|---|---|
| N | 10.53% | 10.70% |
| S | 12.03% | 12.08% |

This novel compound shows biological activity. The compound could also be isolated in a pure state from the reaction of the tri-methylsilyl-ester of 6-isocyanato-penicillanic acid and water where it constituted the main constituent of the solution. PMR spectrum of the free acid in $CDCl_3$: (δ values in ppm): $CH_3$: 1.59 and 1.68; $C_2$—H: 4.33; $C_5$—H and $C_6$—H 5.45-5.73; N—H 7.07 (doublet: J=9 cps.) PMR-spectrum of the di-trimethylsilylester in $CDCl_3$: OSi $(CH_3)_3$: 0.33; $CH_3$: 1.54 and 1.60; $C_2$—H: 4.36; $C_5$—H and $C_6$—H 5.50 → 5.78; N—H: 6.47 The IR spectrum (KBr-disk) of the potassium-salt shows inter al. the following carbonyl absorptions (frequently in. $cm^{-1}$): 1760 (β-lactam), 1665 (C=O of the ureido group), 1600 (carboxylate).

EXAMPLE XIX 1-benzimidazolyl penicillin. In a completely analogous way to Example XVIII 10 mmoles of trimethylsilyl ester of 6-isocyanato-penicillanic acid were reacted with a suspension of 15 mmoles of benzimidazole in toluene. The conversion proceeded rather rapidly at 35°C without apparent evolution of heat. Moist air was passed through the reaction mixture at 0°C and 3.7gm of a chromatographically pure compound precipitated. 1 g of the compound was dissolved in a mixture of 15 ml of ethanol and 50 ml of ether and a solution of 275 mg of cyclohexylamine in 10 ml of ether was added thereto. A crystalline precipitate formed which was washed with ether and dried to obtain 700 mg of the cyclohexylamine salt of 1-benzimidazolylpenicillin which was identified by its IR spectrum.

Elementary analysis for $C_{22}H_{29}N_5O_4S$:

|   | CALCULATED | FOUND |
|---|---|---|
| C | 57.50% | 56.76% |
| H | 6.36% | 6.55% |
| N | 15.24% | 15.06% |
| S | 6.96% | 7.22% |
| O | 13.94% | (14.41%) |

The IR spectrum (KBr-disk) of the cyclohexylamine salt showed inter al. the following carbonyl absorptions (frequency in cm$^{-1}$): 1778 ($\beta$-lactam), 1705 (C = O of the ureido group), 1590 (carboxylate).

The novel product in vitro tests showed a minimum inhibitory concentration of not more than 10 per ml and against staphylococcus A55 and A321, streptococcus hoemolytieus A 266, brucella melitensis A488 and pasteur ella multocida A723.

EXAMPLE XX 6-(N'-methyl-N'-phenyl-ureido) penicillanic acid. In an analogous way to Example XVIII, the trimethylsilyl ester of 6-isocyanato-penicillanic acid was reacted with a 50% excess of N-methylaniline. According to thin layer chromatography, the exothermic reaction proceeded for at least 85% towards the desired penicillin. The reaction product was poured into an ice-cold buffered solution (pH=7) and the pH of the water layer was adjusted to 2 under an upper layer of butyl acetate. The product was washed and dried and upon addition of a solution of potassium-hexanoate, the crystalline potassium-salt of 6-(N'-methyl-N'-phenyl-ureido) penicillanic acid was obtained from the butyl-acetate layer. The substance was identified by its IR and PMR spectra and was biologically active. PMR spectrum of the free acid in CDCl$_3$ ($\delta$ values in ppm). CH$_3$: 1.42 and 1.52 N—CH$_3$: 3.29; C$_2$—H: 4.33; C$_5$—H and C$_6$-H: 5.48 → 5.78; N—H: 5.17 (doublet, J=9 cps.); C$_6$H$_5$; 7.3. PMR-spectrum of the potassium-salt in D$_2$O: CH$_3$: 1.39 and 1.49; N—CH$_3$: 3.23; C$_2$—H: 4.21; C$_5$—H and C$_6$—H: 5.43 → 5.63 (apparently regular AB-quartet; J = 4 cps.); C$_6$H$_5$: 7.38. The IR spectrum (KBr-disk) of the potassium-salt shows inter al. the following carbonyl absorptions (frequently in cm$^{-1}$): 1775 ($\beta$-lactam), 1673 (C = O of the ureido group), 1600 (carboxylate).

EXAMPLE XXI

Benzyloxy-penicillin (benzyl carbamate of 6-aminopenicillanic acid). A solution of 10 mmoles of the trimethylsilyl ester of 6-isocyanato-penicillanic acid in 13.4 ml of toluene was evaporated to dryness at room temperature under reduced pressure. To the solid isocyanate, 10 ml of freshly distilled benzyl alcohol and 0.1 ml of pyridine were added at 0°C and the isocyanate dissolved without evolution of heat. The solution was then stirred for 45 minutes at room temperature. According to thin layer chromatography, the conversion of the isocyanate to benzyloxypencillin had proceeded for 70%. The reaction mixture was diluted with 125 ml of ether and extracted with 3 portions totalling 100 ml of 1 M phosphate buffer (pH=7). The water layer was acidified, under an upper layer of 50 ml of ether, to a pH of 2.5. The ether layer was decanted and the water layer was once extracted with 25 ml of ether. The ether extracts were combined, washed and dried over calcium sulfate. After filtration, the solution was treated with N-ethyl-piperidine dissolved in 15 ml of acetone. The resulting oil was scratched and left standing for 12 hours at 0°C to crystallize. The crystals were vacuum filtered, washed twice with ether and once with a small amount of acetone and dried in a vacuum desiccator, to obtain 1 g of crystalline N-ethyl-piperidine salt of benzyloxypenicillin, which according to thin layer chromatography, was in a pure state. It was identified by its IR spectrum.

Elementary analysis (C,H,N and S) for C$_{23}$H$_{33}$N$_3$O$_5$S:

|   | CALCULATED | FOUND |
|---|---|---|
| C | 59.59% | 59.22% |
| H | 7.18% | 7.29% |
| N | 9.07% | 8.58% |
| S | 6.94% | 6.69% |
| O | 17.22% | (18.22%) |

EXAMPLE XXII

Ethyloxypenicillin (ethyl carbamate of 6-aminopenicillanic acid. In an analogous way to Example XXI, 2 gm of the amorphous cyclohexylamine salt of ethyloxypenicillin was obtained from 10 mmoles of the trimethylsilyl ester of 6-isocyanato-penicillanic acid and excess ethanol. This compound, which was at the least 90% pure, showed the expected IR and PMR spectra. PMR spectrum of the cyclohexylamine salt in CDCl$_3$: ($\delta$ values in ppm); C$_3$—CH$_3$: 1.58 and 1.64; CH$_3$ (ethyl); 1.27 (quartet: J=7 cps.); CH$_2$ (ethyl); 4.21 (triplet: J=7 cps.); C$_2$—H: 4.24; C$_5$—H and C$_6$—H: 5.42 → 5.70;

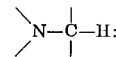

3.0; NH$_2$ and COOH: 7.67.

The IR spectrum (KBr-disk) of the cyclohexylamine salt shows inter al. the following carbonylabsorptions (CM$^{-1}$): 1780 ($\beta$-lactam); 1715 (C=O of the carbamine-ester group), ca. 1620 (carboxylate).

The product in vitro tests has a minimum inhibiting concentration of less than 3$\gamma$ per ml against bacillus subtilis 6633, staphylococcus aureus A55 and streptococcus hoendytieus A266.

EXAMPLE XXIII p-methoxy-phenyloxypenicillin (p-methoxy-phenylcarbamate of 6-aminopenicillanic acid. 22 mmoles of p-methoxy-phenol and 0.3 mmol of di-butyltin diacetate were dissolved in 10 ml of toluene and under a nitrogen atmosphere, a solution of 20 mmoles of the trimethylsilyl ester of 6isocyanatopenicillanic acid in 40 ml of toluene was added dropwise with stirring at 65°C over a period of 1 hour. Stirring was continued for 75 minutes at this temperature. The thin layer chromatogram demonstrated that by then the isocyanate had virtually disappeared and the desired compound has been formed in 50% yield. A dilute sodium hydroxide solution was added and the reaction mixture was poured into a ice-water mixture under stirring. At a pH of 6.0 toluene was extracted with ether and the water layer was once extracted with ether. The water layer was acidified to a pH of 3.8 at 0°C under an upper layer of ether and then the acid water layer was twice extracted with a little ether. The three ether layers were combined and three times washed with a little ice water and dried over calcium sulfate. The ether extract contained p-methoxy-phenyloxypenicillin in 85% pure form according to thin layer chromatography. The ether was evaporated at 0°C and the remaining oil was washed three times with a small amount of cold ether. The oil was dissolved in cold acetone and a small excess of N-ethylpiperidine dissolved in acetone was added dropwise. Addition of a few drops of ether induced the product to crystallize. Upon filtration, washing with ether and acetone and drying the crystalline product (4 g) consisted of at least 85% of the N-ethylpiperidine salt of p-methoxy-phenyloxypenicillin which was confirmed by IR and PMR-spectra. PMR spectrum of the N-ethylpiperidine salt in $CDCl_3$ ($\delta$-values in ppm); $CH_3$; 1.65 and 1.70; $O-CH_3$: 3.78; $C_2-H$: 4.40; $C_5-H$ and $C_6-H$: 5.3 → 5.72; N-H: 5.90; $C_6H_4$: 6.67 → 7.33.

In an analogous way, the reaction of the trimethylsilyl ester of 6-iso-cyanatopenicillanic acid with p-bromophenol and with phenol led to the p-bromophenyloxy-, and phenyloxypenicillin respectively. A small amount of potassium-t. butoxide or dibutyltin diacetate can be used as a catalyst.

EXAMPLE XXIV

Nafcillin-1'-[2-ethoxy)naphthyl] penicillin. 3.4 g (0.14 mmole) of granular magnesium were added to a solution of 15 g (0.06 mmole) of 1-bromo-2-ethoxynaphthalene in 100 ml of anhydrous ether and the mixture was heated with vigorous stirring and under a nitrogen atmosphere at reflux until reaction set in. Over a period of 4 hours, a solution of 11.28 g (0.06 mmole) of dibromo-ethane (serving as "entrainer") in 60 ml of ether was added dropwise to the gently boiling mixture, and the Grignard reagent formed precipitated. About 40 ml of ether was removed by evaporation and 50 ml of anhydrous tetrahydrofuran were then added. The mixture that could then be stirred easier was cooled down to −40°C and a solution of 0.037 mmole of the trimethylsilyl ester of 6-isocyanato-penicillanic acid in 73 ml of toluene was added dropwise. Stirring was continued for 20 minutes at −30°C. With simultaneous addition of phosphoric acid, the reaction mixture was poured into 200 ml of ice-water. The pH was adjusted to 6.5 and the organic layer separated. At a pH of 6.5, the water layer was twice extracted with ether. The organic layers were combined and twice extracted with 50 ml of ice-water at pH of 6.5. The impure water layers containing all the nafcillin formed were combined. Under an upper layer consisting of a mixture of ether and ethyl-acetate (3:1), the pH of the water layers was adjusted to 4.3 by addition of phosphoric acid. Upon extraction (three times), all nafcillin was taken up in the organic layer and successive washing with water, drying over magnesium sulfate and evaporation to dryness yielded 5.1 g of crystalline nafcillin in the form of the free acid. The mother liquid yielded a further crop of 3.02 g of nafcillin for a total yield of 8.12 g (53%). The product melted at 136°–140°C and the IR spectrum was identical to that of a standard reference sample; according to a microbiological determination it contained 89% of nafcillin.

EXAMPLE XXV

A. α-carboxy-benzylpenicillin (carbenicillin). 3.87 g (18 mmoles) of α-bromophenyl acetic acid were silylated in 80 ml of toluene with 2.9 ml of trimethylchlorosilane and 2.65 ml of triethylamine and upon standing for 90 minutes, the hydrochloride of triethylamine was filtered off and the solution was concentrated to 55 ml. In a nitrogen atmosphere, this solution was added over a period of 15 minutes to a solution of 18 mmoles of butyllithium in 18 ml of ether which solution had been cooled down to −60°C. After stirring for a further 90 minutes at −60°C a solution of 15 mmoles of 6-isocyanatopenicillanic acid-trimethyl-silyl ester in 20 ml of toluene was added dropwise over 30 minutes while the temperature was kept at −60°C. Stirring was continued for another hour at −60°C and the reaction mixture was then poured into 200 ml of 0.25 M phosphate buffer (pH = 7) at 0°C. A small amount of solid material was removed by centrifugation. The layers were separated and the pH of the water layer was adjusted to 4.5. A byproduct formed was removed by extraction with a methyl isobutyl ketone. The pH of the water layer was then brought to 3 and the layer was several times extracted with methyl isobutyl ketone. From the resulting extract the disodium salt of carbenicillin was obtained in the usual way with sodium methyl capronate for a yield of 3.2 g (50%). The product was identified by its IR and PMR spectrum and its antibiotic spectrum, a reference sample being used as a standard.

B. α-carboxy-benzylpenicillin. A solution of 10 mmoles of butyllithium in ether was diluted with petroleum ether and an equivalent of tetramethylethylene diamine was added. After cooling the mixture to −60°C, a mol equivalent of the trimethylsilyl ester of phenylacetic acid dissolved in toluene was added dropwise. The suspension was stirred for 4 hours at −60°C and at this temperature an equivalent amount of 6-isocyanato-penicillanic acid-trimethylsilyl ester dissolved in toluene was added dropwise. Stirring was continued for some hours at −60°C. The reaction mixture was then worked up in the usual way, to also yield the disodium salt of carbenicillin.

EXAMPLE XXVI

α-cyanobenzylpenicillin. Under exclusion of moisture and atmospheric oxygen, 3.52 g (27.5 mmoles) of naphthalene and 0.575 g (25 mmoles) of sodium were reacted in 45 ml of anhydrous tetrahydrofuran and the reaction mixture was stirred for 2 hours at room temperature. Over a period of 30 minutes, a solution of 2.92 g (25 mmoles) of benzylcyanide in 7.5 ml of tetrahydrofuran was added with the temperature being kept below 35°C. The solution turned pale yellow and over a period of 45 minutes this solution was added dropwise to a chilled (−40°C) solution of 12.5 mmoles of trimethylsilyl ester of 6-isocyanato-penicillanic acid in 65 ml of toluene. The ensuing suspension was stirred for 90 minutes at −40°C. With vigorous stirring, the reaction mixture was poured into 150 ml of ice-water with concurrent addition of a dilute phosphoric acid solution to keep the pH at 7. The layers were separated and the water layer was twice extracted with ether, 40 ml of methyl isobutyl ketone were added to the water layer. The mixture was stirred and the pH adjusted to 3.5 by means of acidification with phosphoric acid. The organic layer was then separated and the water layer again was twice extracted with 40 ml of methyl isobutyl ketone at pH of 3.5. The combined organic layers were washed with ice-water, dried over calcium sulfate, and filtered. To the filtrate, cyclohexylamine is added and the resulting precipitate (1.4 g) was washed with acetone. It turned out to be a by-product as proved by thin layer chromatogram. The washings of acetone and the filtrate were poured into 650 ml of ether giving a flocculent precipitate of 3.58 g. The mother liquid yielded another crop of 300 mg. The solid material was combined (3.88 g) and appeared to consist of α-cyanobenzyl-penicillin-cyclohexylamine salt in a 70% pure state. Overall yield of the reaction was at least 45% of α-cyanobenzyl-penicillin.

EXAMPLE XXVII

6-[N'-(o-Methylaminobenzyl)-ureido] penicillanic acid. The procedure of Example XIII was followed except that o-methylaminobenzylamine was used in the place of aniline. 6-[N'-(o-Methylaminobenzyl)-ureido] penicillanic acid was isolated by a zwitterion by concentration in vacuo of the reaction solvent. This novel product was soluble in dimethylacetamide, and exhibited the infrared absorption characteristics typical of this structure. The proton magnetic resonance spectrum was also consistent with the structure of this compound.

In in vitro tests, this product had a minimum inhibitory concentration of not more than 1γ per ml against bacillus subtilis 6633, stephylococcus aureus A55 and A321, streptococcus hoemolytious, A266 and diplococcus pneumoniae L54.

EXAMPLE XXVIII

6-[N'-(2-Dimethylaminoethyl)-ureido]penicillanic acid. The procedure of Example XIII was followed except that 2-dimethylaminoethylamine was used in the place of aniline. 6-[N'-(2-Dimethylaminoethyl)-ureido]penicillanic acid was isolated as a zwitterion by concentration in vacuo of the reaction solvent. This novel product was soluble in water, and exhibited the infrared absorption characteristics typical of this structure. The proton magnetic resonance spectrum was also consistent with the structure of this compound.

In in vitro tests, this product has a minimum inhibitory concentration of not more than 5γ per ml against Bacillus subtilis 6633, staphylococcus aureus A55, streptococcus hoemolyticus A266 and Escherichia coli U 20.

EXAMPLE XXIX

ε-[N'-(3-Dimethylaminopropyl)-ureido]penicillanic acid. The procedure of Example XIII was followed except that 3-dimethylaminopropylamine was used in the place of aniline. 6-[N'-(3-Dimethylaminopropyl)-ureido] penicillanic acid was isolated as a zwitterion by concentration in vacuo of the reaction solvent. This novel product was soluble in water, and exhibited the infrared absorption characteristics typical of this structure. The proton magnetic resonance spectrum was also consistent with the structure of this compound. Determination of the PMR-spectrum in a solution of hexadeutero-dimethylsulphoxide was analyzed as follows: (values in ppm): $C_3$—$CH_3$(6 protons): 1.53 and 1.63; $C_2H_2$(2 protons); 1.4–2.0 (badly dissolved multiplet); $N(CH_3)_2$: 2.82; N—$CH_2$ (4 protons): 2.97–3.20 (two coinciding triplets, J≈7 cps); $C_2$—H: 4.28; $C_5$—H and $C_6$—H: 5.33–5.63 (multiplet; N—H(2 protons); 6.5–6.9.

In in vitro tests, this product had a minimum inhibitory concentration of not more than 1γ per ml against bacillus subtilis 6633, staphylococcus aureus A55, streptococcus haemolyticus A 266 and Escherichia coli U 20.

EXAMPLE XXX

6-[N'-(3-Morpholinopropyl)-ureido]penicillanic acid. The procedure of Example XIII was followed except that 3-morpholinopropylamine was used in the place of aniline. 6-[N'-(3-Morpholinopropyl)-ureido]penicillanic acid was isolated as a zwitterion by concentration in vacuo of the reactant solvent. This novel product was soluble in water, and exhibited the infrared absorption characteristics typical of this structure. The proton magnetic resonance spectrum was also consistent with the structure of this compound.

In in vitro tests, this product had a minimum inhibitory concentration of less than 1γ per ml against bacillus subtilis 6633, staphylococcus aureus A55 and streptococcus hoemolyticus A266.

EXAMPLE XXXI

6-[N'-(3-Bis[hydroxyethyl]aminopropyl)-ureido]penicillanic acid. The procedure of Example XIII was followed except that 3-bis(hydroxyethyl)aminopropylamine was used in the place of aniline. 6-[N'-(3-Bis[hydroxyethyl]aminopropyl)-ureido]penicillanic acid was isolated as a zwitterion by concentration in vacuo of the reaction solvent. This novel product was insoluble in water, and exhibited the infrared absorption characteristics typical of this structure. The proton magnetic resonance spectrum was also consistent with the structure of this compound.

In in vitro tests, this product has a minimum inhibitory concentration of less than 10γ per ml against bacillus subtilis 6633, staphyloccus aureus A55, A321 and A355 and streptoccus hoemolyticus A266.

EXAMPLE XXXII

6-[N'-(2-[N-methylanilino]ethyl)-ureido]penicillanic acid. The procedure of Example XIII was followed except that 2-(N-methylanilino)ethylamine was used in the place of aniline. 6-[N'-(2-[N-methylanilino]ethyl)-ureido]penicillanic acid was isolated as a zwitterion by concentration in vacuo of the reaction solvent. This novel product was insoluble in water, and exhibited the infrared absorption characteristics typical of this structure. The proton magnetic resonance spectrum was also consistent with the structure of this compound.

In in vitro tests, this product had a minimum inhibitory concentration of less than 1γ per ml against Bacillus subtilis 6633, Staphylococcus aureus A55 and A321 and Streptococcus haemolyticus A266.

EXAMPLE XXXIII

6-[N'-(2-Morpholinoethyl)-ureido]penicillanic acid. The procedure of Example XIII was followed except that 2-morpholinoethylamine was used in the place of aniline. 6-[N'-(2-Morpholinoethyl)-ureido]penicillanic acid was isolated as a zwitterion by concentration in vacuo of the reactant solvent. This novel product was insoluble in water, and exhibited the infrared absorption characteristics typical of this structure. The proton magnetic resonance spectrum which was also consistent with the structure of this compound was analyzed as follows: $C_3$—$CH_3$(6 protons): 1.52 and 1.60; $C_2H_2$ (2 protons: 1.4–2.0; N—$CH_2$ (8 protons): 2.5–3.3; O—$CH_2$ (4 protons): 3.45–3.95; $C_2$—H: 4.18;

$C_5$—H and $C_6$—H: 5.33–5.67; N—H (2 protons): 6.2–6.8.

In in vitro tests, this product had a minimum inhibiting concentration of less than 5γ per ml against Bacillus subtilis 6633, and Staphyloccus aureus A55 and A321.

EXAMPLE XXXIV

6-[N'-(3-Dibutylaminopropyl)-ureido]penicillanic acid. The procedure of Example XIII was followed except that 3-dibutylaminopropylamine was used in the place of aniline. 6-[N'-(3-Dibutylaminopropyl)-ureido]penicillanic acid was isolated as a zwitterion by concentration in vacuo of the reactant solvent. This product was insoluble in water, and exhibited the infrared absorption characteristics typical of this structure. The proton magnetic resonance spectrum was also consistent with the structure of this compound.

In in vitro tests, this product had a minimum inhibiting concentration of less than 2 α per ml against Bacillus subtilis 6633 and Staphylococcus aureus A55 and A321.

EXAMPLE XXXV

6-[N'-(3-[4-Methylpiperazino]propyl)-ureido]penicillanic acid. The procedure of Example XIII was followed except that 3-(4-methylpiperazino)propylamine was used in the place of aniline. 6-[N'-(3-[4-Methylpiperazino]propyl)-ureido]penicillanic acid was isolated as a zwitterion by concentration in vacuo of the reaction solvent. This product was insoluble in water, and exhibited the infrared absorption characteristics typical of this structure. The proton magnetic resonance spectrum was also consistent with the structure of this compound.

EXAMPLE XXXVI 6-(N'-Adamantyl ureido)penicillanic acid. The procedure of Example XIII was followed except that 1-adamantylamine was used in the place of aniline. 6-(N'-Adamantylureido)penicillanic acid was isolated as such by concentration in vacuo of the reaction solvent, and trituration under ether. This product was insoluble in water, and exhibited the infrared absorption characteristics typical of this structure. The proton magnetic resonance spectrum was also consistent with the structure of this compound

EXAMPLE XXXVII

6-[N'-(2,6-Dichlorophenyl)-ureido]penicillanic acid. The procedure of Example XIII was followed except that 2,6-dichloroaniline was used in the place of aniline. 6-[N'-(2,6-Dichlorophenyl)-ureido]penicillanic acid was isolated as such by concentration in vacuo of the reaction solvent and trituration under ether. This product was insoluble in water and soluble in dimethyl acetamide and exhibited the infrared absorption characteristics typical of this structure. The proton magnetic resonance spectrum was also consistent with the structure of this compound.

EXAMPLE XXXVIII

6-[N'-(p-Carboxyphenyl)-ureido]penicillanic acid. The procedure used in Example XV was employed using the O, N-di)trimethylsilyl) derivative of p-aminobenzoic acid rather than the corresponding derivative of p-amino salicylic acid. 6-[N'-(p-carboxyphenyl)-ureido]penicillanic acid was obtained and isolated as such by concentration in vacuo of the reaction solvent and trituration under diethyl ether. This compound exhibited the infrared absorption characteristics typical of this structure, and the proton magnetic resonance spectrum was also consistent with the indicated structure.

EXAMPLE XXXIX

6-[N'-(2-[3-Indolyl]-1-carboxyethyl)-ureido]penicillanic acid. The procedure used in Example XV was employed using the O, N-di(trimethylsilyl) derivative of tryptophan rather than the corresponding derivative of p-aminosalycylic acid. 6-[N'-(2-[3-Indolyl]-1-carboxyethyl)ureido]penicillanic acid was obtained and isolated as such by concentration in vacuo of the reaction solvent and trituration under ether. This compound was insoluble in water and soluble in dimethyl acetamide, and exhibited the infrared absorption characteristics typical of its structure, and the proton magnetic resonance spectrum was also consistent with the indicated structure.

EXAMPLE XL

6-[N'-(2-Cyclohexyl-1-carboxyethyl)-ureido]penicillanic acid. The procedure used in Example XV was employed using the O, N-di(trimethylsilyl)-derivative of α-aminocyclohexanepropionic acid rather than the corresponding derivative of p-aminosalycylic acid. 6-[N'-(2-Cyclohexyl-1-carboxyethyl) -ureido]-pencillanic acid was obtained and isolated as such by concentration in vacuo of the reaction solvent and trituration under ether. This compound was insoluble in water and insoluble in dimethyl acetamide, and exhibited the infrared absorption characteristics typical of its structure, and the proton magnetic resonance spectrum was also consistent with the indicated structure.

In in vitro tests the product has a minimum inhibiting concentration of less than 10 γ per ml against bacillus subtilis 6633, staphylococcus aureus A55 and posteunella multocida A723.

EXAMPLE XLI

6-[N'-(2-Mercapto-1-carbethoxyethyl)-ureido]penicillanic acid. The procedure used in Example XV was employed using the O, N-di(trimethylsilyl) derivative of cysteine ethyl ester rather than the corresponding derivative of p-aminosalycylic acid. 6-[N'-(2-Mercapto-1-carbethoxyethyl) -ureido]penicillanic acid was obtained and isolated as such by concentration in vacuo of the reaction solvent and trituration under ether. This compound was insoluble in water and soluble in dimethyl acetamide, and exhibited the infrared absorption characteristics typical of its structure, and the proton magnetic resonance spectrum was also consistent with the indicated structure.

EXAMPLE XLII

6-[N'-(1-Carboxycyclopentyl)-ureido]penicillanic acid. The procedure used in Example XV was employed using the O,N-di(trimethylsilyl)derivative of 1-aminocyclopentane-carboxylic acid rather than the corresponding derivative of p-aminosalycyclic acid. 6-[N'-(1-Carboxycyclopentyl)-ureido]penicillanic acid was obtained and isolated as such by concentration in vacuo of the reaction solvent and trituration under ether. This compound was insoluble in water and soluble in dimethyl acetamide, and exhibited the infrared absorption characteristics typical of its structure, and the proton magnetic resonance spectrum was also consistent with the indicated structure.

EXAMPLES XLIII TO XLV (3-Quinuclidinyloxy)penicillin, (2-Morpholinoethoxy) penicillin, (2-Dimethylaminoethoxy)penicillin. The procedure described in Example XXI was followed except that the addition of pyridine was omitted and in place of benzyl alcohol, one of the following alcohols was used 3-quinuclidinol, 2-morpholinoethanol, or 3-dimethylaminoethanol. The following corresponding 6-(substituted —OCO—NH)penicillanic acids were isolated as such by concentration in (3-quinuclidinyloxy) penicillin, (2-morpholinoethoxy)penicillin and (2-dimethylaminoethoxy)penicillin. All of these novel compounds were insoluble in water and the 3-quinuclidinyloxy derivative was soluble in dimethyl acetamide. All of these compounds exhibited infrared absorption characteristics typical of the indicated structures. Their proton magnetic resonance spectra were also consistent with the indicated structure.

EXAMPLE XLVI (2-Dimethylaminoethylmercapto)penicillin. The procedure of Example XXI was followed substituting 2-dimethylaminoethylmercaptan for benzyl alcohol and omitting the addition of pyridine. (2-Dimethylaminoethylmercapto)penicillin was prepared and isolated as such by concentration in vacuo of the reaction solvent and trituration under diethyl ether. This novel compound was insoluble in water and exhibited infrared absorption characteristics typical of the indicated structures. Their proton magnetic resonance spectra were also consistent with the indicated structure.

In in vitro tests, this product had a minimum inhibiting concentration of less than $10\gamma$ per ml against bacillus subtilis 6633 and streptococcus heomolyticus A 266.

All of the novel compounds of Examples XXVII — XLVI show biological activity against gram negative and gram positive bacteria in in vitro tests.

EXAMPLE XLVII.

A. Solution of the Trimethylsilyl Ester of 6-Isothiocyanatopenicillanic Acid.

A double-walled flask was used for the reaction and cooling was effected by circulating a refrigerant via a thermostat which could be operated to give any chosen temperature. The flask was connected to a filter unit via a Teflon foil which could be mechanically ruptured by readjustment of the stirrer, thereby permitting cold filtration of the reaction in the absence of air.

17.2 g. (79.5mmoles) of 6-aminopenicillanic acid and 270 ml. of dichloromethane were placed in the flask equipped with stirrer, dropping funnel, $P_2O_5$-tube and gas inlet tube, through which nitrogen was admitted. 25.5 ml (183mmoles) of triethylamine were added thereto and over a period of about 15 minutes, 28.5 ml. (225.5mmoles) of trimethylchlorosilane were added dropwise at 20°C. Stirring was continued at 20°C for about 60 minutes after completion of the addition and after the temperature was lowered to −55°C, 200 ml of toluene and 2 ml. (14.5mmoles) of triethylamine and thereafter, 9 ml (116mmoles) of thiophosgene were added causing the temperature to rise about 8°C to about −47°C. Stirring was continued for 60 minutes at −45°C and the temperature was again brought to −55°C. Another portion of 11.5 ml (82.5mmoles) of triethylamine was added causing the temperature of the reaction medium to rise at least 10°C and the medium itself to become almost colorless. Stirring was continued for 4 hours at −45°C and at this temperature, the precipitate formed was filtered off under nitrogen and washed three times with cold, anhydrous toluene (altogether 300 ml). From the combined filtrate and washings, the greater part of the excess thiophosgene together with trimethylchlorosilane, triethylamine and dichloromethane was allowed to evaporate under reduced pressure starting at an internal temperature of −45°C.

When only traces of dichloromethane could still be detected in the distillate, 250 ml of cold anhydrous toluene were added to the residue to remove the last traces of thiophosgene. During this procedure, the temperature was allowed to slowly rise to room temperature. The resulting slightly colored solution was filtered at room temperature in the absence of water to obtain a final volume of 250 ml [75mmole - 94% yield] of the clear solution in toluene of the trimethylsilyl ester of 6-isothiocyanatopenicillanic acid, which is a new compound in a concentration of 0.3 mmol/ml.

EXAMPLE XLVIII

Solution of the Trimethylsilyl Ester of 6-isothiocyanatopenicillanic acid 12.9 g (59.5 mmol) of 6-aminopenicillanic acid were suspended in 100 ml. of dichloromethane and 9.1 ml (65 mmol) of triethylamine were then added under a nitrogen atmosphere followed by dropwise addition of 7.9 ml (62.5 mmol) of trimethylchlorosilane. The mixture was stirred at room temperature for 60 minutes and was then added, with vigorous stirring, under a nitrogen atmosphere to a mixture of 7 ml (90 mmol) of thiophosgene, 9.1 ml (65 mmol) of triethylamine, 50 ml. of dichloromethane and 150 ml of toluene, previously cooled to −50°C, at such a rate that the reaction temperature did not rise above −40°C. Following this, another 50 ml of dichloromethane were added and stirring was continued at −40°C for another 60 minutes. After cooling to −45°C, 7.5 ml (54 mmol) of triethylamine were added dropwise, care being taken that the temperature did not rise above − 40°C. The reaction mixture was stirred at −40°C for 3 hours and was filtered at that temperature under a nitrogen atmosphere. The precipitate on the filter was washed three times with a total amount of 400 ml. of cold anhydrous toluene. While the temperature was allowed to rise slowly from −50°C, the combined filtrates were evaporated under reduced pressure and the solution was filtered again at room temperature to obtain a final volume of 113.5 ml [35 mmol-59% yield] of the clear solution of the trimethylsilyl ester of 6-isothiocyanato penicillanic acid in toluene at a concentration of 0.31 mmol/ml.

EXAMPLE XLIX

Isolation and Characterization of the trimethylsilyl Ester of 6-isothiocyanatopenicillanic acid 250 ml. of the solution of the trimethylsilyl ester of 6-isothiocyanatopenicillanic acid in toluene (Example XLVII) were concentrated at room temperature under reduced pressure to a volume of about 100 ml. Some crystallization occurred, but the crystals virtually completely disappeared when the solution was slightly heated, after which it was held at room temperature for some hours. It was then cooled at 3°C for some hours and left standing overnight at −18°C. The semi-solid product was filtered off under a nitrogen atmosphere at −25°C and the crystals were washed three times with cold anhydrous toluene. Residual toluene adhering to the crystalline product was then removed under reduced pressure to obtain 16.5 g of the trimethylsilyl ester of 6-isothiocyanatopenicillanic acid melting at 102°–105°C and having a specific rotation $[\alpha]_D^{20°} = +160.9°$ (c=1% in dichloromethane). Molecular weight according to mass spectroscopy: 330 (calculated 330).

Analysis: $O_{12}H_{18}N_2O_3S_2Si$:
Calculated: %C 43.61  %H 5.49  %N 8.44
Found: 43.94  5.47  8.37

The IR and PMR spectra in toluene (before isolation) and in chloroform (after isolation) indicate the structure of the compound and the purity of the solution in toluene primarily obtained (which can be better than 95%).

The primarily obtained solutions in toluene could be stored for weeks at about 0°C without any appreciable decomposition. The solid product could be stored at room temperature for months provided the usual precautions, applicable to hydroscopic substances, were taken. The solid readily dissolved in solvents such as diethyl ether and dichloromethane. Analysis of the PMR spectra of the trimethylsilyl ester of 6-isothiocyanatopenicillanic acid (taken at 60 Mc; δ -values in ppm, using tetramethylsilane as internal standard:

| Solvent (conc.) | $Si(CH_3)_3$ | $CH_3$ | $C_2$-H | $C_3$H and $C_6$-H AB quartet; J=4.0 ± 0.2 cps |
|---|---|---|---|---|
| Toluene (about 105 mg./ml.) | 0.17 | 1.27 1.35 | 4.37 | 3.95 4.02 4.87 4.94 |
| $CDCl_3$ (about 110 mg./ml.) | 0.33 | 1.56 1.70 | 4.52 | 5.08 5.15 5.54 5.61 |

Partial analysis of the IR spectrum of the trimethylsilyl ester of 6-isothiocyanatopenicillanic acid recorded in chloroform: con.: about 10 mg./ml
$N=C=S$ at $2060 cm^{-1}$, $C=O$ at $1788$ $cm^{-1}$ β lactam, $C=O$ ester at $1720$ $cm^{-1}$ and $Si(CH_3)_3$ at $850$ $cm^{-1}$

EXAMPLE L

6-Isothiocyanatopenicillanic Acid 2.g of the trimethylsilyl ester of 6-isothiocyanatopenicillanic acid were added portion-wise with stirring to 35 ml. of acetone containing about 3% water at a temperature of −8°C. After 10 minutes stirring, the solution was concentrated to about 5 ml. and 25 ml. of cold anhydrous acetone were added thereto with stirring at a temperature of 0°C. The solvent was again removed under reduced pressure and 25 ml. of anhydrous purified ethyl acetate were added to the slightly moist light yellow oil. After evaporation of the solvent, another 10 ml. of anhydrous purified ethyl acetate were added to the virtually anhydrous oil. According to the thin layer chromatogram, the 6-isothiocyanatopenicillanic acid had not suffered in quality from this treatment. The solution was concentrated under reduced pressure at 0°C whereby spontaneous crystallization was induced. After cooling at −18°C and filtration, the crystals were washed while still at−18°C. with small volumes of ethyl acetate and dichloromethane in succession and dried to obtain pure colorless crystalline 6-isothiocyanato penicillanic acid according to thin layer chromatography, which was confirmed by characterization using spectroscopic methods. The product may be recrystallized from dichloromethane.

In an analogous way, 6-isothiocyanatopenicillanic acid could be obtained in the form of an oil or solid directly from solutions of its trimethylsilyl ester in toluene.

Both oil and solid could be dissolved in an aqueous buffer solution (pH = 7) without appreciable decomposition. From acidified aqueous solutions, the compound could be isolated by extractions with such solvents as diethyl ether or ethyl acetate and in such instances, decomposition could be limited to 5% at most.

6-isothiocyanatopenicillanic acid, which is a new compound, has been characterized as follows: Thin layer chromatography: Rf = 0.48 (silica; diethylether; formic acid = 98:2) $[\alpha]_D^{20°} = 199°$ (c = 1% in dichloromethane)

Conduct upon heating.

The compound does not have a characteristic melting point. Above 110°C, the color changes to yellowish and at about 150°C a further discoloration to brown sets in. Melting accompanied by advanced decomposition takes place above 170°C.

Analysis: $C_9H_{10}N_2S_2O_3$

Calculated:
%C 41.84  %H 3.90  %N 10.85  %S 24.83  %O 18.58
Found:
41.71  3.98  10.70  24.72  18.89

Partial analysis of the IR-spectrum (recorded in chloroform) concentration: about 10 mg/ml; values in $cm^{-1}$

| OH (carboxyl) | N=C=S | C=O(β-lactam) | C=O (carboxyl) |
|---|---|---|---|
| about 3500 | about 2055 | 1790 | 1725 (presumably the dimer) |
| about 2650 | | | |
| about 2550 | | | 1765 shoulder (presumably the monomer) |

Analysis of the PMR spectrum of a solution of 6-isothiocyanatopenicillanic acid in $CDCl_3$ (taken at 60 Mc; $\delta$-value in ppm, using tetramethylsilane as internal standard:

| $CH_3$ | $C_2$—H | $C_5$—H and $C_6$—H AB quartet $J = 4.0 \pm 0.2$ cps | — COOH |
|---|---|---|---|
| 1.62 1.74 | 4.61 | 5.12 5.19 5.55 5.62 | about 10 |

The position in the spectrum of the four absorption lines to be ascribed to the protons attached to $C_5$ and $C_6$ respectively was strongly dependent on the concentrations and the choice of solvent.

An experiment conducted at a pH of 10 to 10.5 yielded a mixture containing relatively more of the trans isomer than the sulphur-containing and sulphur-free degradation products. A series of extractions resulted in the isolation of an oil, which by thin layer chromatography was shown to be free from other sulphur-containing compounds and a PMR spectrum demonstrated the presence of smaller amounts of one or two by-products which probably do not have an S-atom in the ring. When by-products are left out of consideration, the PMR spectrum of a solution of the mixture in $CDCL_3$ (taken at 60 Ml; $\delta$-values in ppm with tetramethylsilane as internal standard) was analysed as follows:

|  | $CH_3$ | $C_2$—H | $C_3$—H and $C_6$—H |  |  | AB Quartets |
|---|---|---|---|---|---|---|
| Cis-5,6-(45%) | 1.60 | 1.72 | 4.60 | 5.11 | 5.18 | 5.54 5.61 ($J=4.0\pm0.2$ cp) |
| trans-5,6-(55%) | 1.57 | 1.60 | 4.60 | 4.85 | 4.88 | 5.37 5.40 ($J=1.8\pm0.2$ cp) |

Stability and Solubility of 6-isothiocyanatopenicillanic Acid.

The compound was easily soluble in diethyl ether, acetone, ethyl acetate and chloroform and the solubility in dichloromethane was somewhat less. The stability of the solid and of solutions thereof in, for example, the above mentioned solvents and in water at pH = 7 depended to a considerable extent on the degree of purity and the color of the product. Solid, colorless 6-isothiocyanatopenicillanic acid retained its good quality upon storage at room temperature for several days; much the same applied for solutions prepared from the colorless solid.

Isomerisation ($C_6$-epimerisation) of 6-isothiocyanatopenicillanic Acid in AlkalineMedium Solutions of 6-isothiocyanato-(cis-5,6)-penicillanic acid in water with a pH between about 5 and 7.5 were fairly stable and addition of dilute sodium hydroxide solutions brought about a fairly rapid, partial isomerisation into 6-isothiocyanato-(trans-5,6)-penicillanic acid (C-epimerisation). The conversion could also be effected by adding small portions of the trimethylsilyl ester of 6-isothiocyanatopenicillanic acid to an aqueous alkaline solution while maintaining the pH at 9.0 to 9.5 by addition of dilute sodium hydroxide solution. In about 60 minutes at 0°C and a pH of 9 to 9.5, equilibrium is reached and extension of the reaction period did not have any effect. According to thin layer chromatography, no further sulphur-containing reaction products have formed and the starting product was epimerised to the extent of about 45% to the trans isomer which has a somewhat larger Rf. Upon acidification to a pH of 4.5 and extraction with diethyl ether, a semi-solid oil which still had the same composition according to thin layer chromatography was obtained and its IR spectrum shows the values mentioned above for the cis isomer.

EXAMPLE LI

The dicyclohexylamine salt of 6-isothiocyanatopenicillanic acid.

Using the procedure of Example L, 1.86 g of solid trimethylsilyl ester of 6-isothiocyanatopenicillanic acid was quantitatively converted to 6-isothiocyanatopenicillanic acid dissolved in about 10 ml. of ethyl acetate. A precooled solution of 1.029 g (1% in excess) of dicyclohexylamine in 15 ml of ethyl acetate and 5 ml of acetone was added thereto at a rapid rate at −5°C and with stirring. Thin-layer chromatographic methods demonstrated that no decomposition of the isothiocyanato compound occurred and moreover, that it was very unlikely that the amine entered into reaction with the isothiocyanato group. The light yellow solution thus obtained was concentrated under reduced pressure until the solution turned turbid. The mixture was held at room temperature for 15 minutes and then left standing overnight at −18°C. The crystalline precipitate was filtered off at −20°C and washed subsequently with ethyl acetate and diethyl ether. After drying, 1.70 g (68% yield) of the colorless dicyclohexylamine salt of 6-isothiocyanatopenicillanic acid, which is a new compound, were obtained. Characteristics of the dicyclohexylamine Salt of 6-isothiocyanatopenicillanic acid.

The compound did not have a sharp melting point; between 120° and 125°C the product began to show a brown decoloration and liquefaction and decomposition occurred between about 175° and 185°C. Thin-layer chromatography (silica; diethyl ether: formic acid = 98:2) showed a component with the same Rf value (0.48) as 6-isothiocyanatopenicillanic acid. $[\alpha]_D^{20} = \pm 137.1°$ (c. = 1% in dichloromethane)

| Analysis $C_{21}H_{33}N_3O_3S_2$ | | | | | |
|---|---|---|---|---|---|
| Calculated: %C 57.39 | %H 7.57 | %N 9.56 | %S 14.59 | %O 10.89 |
| Found: 57.19 | 7.58 | 9.36 | 14.30 | 11.57 |

PMR spectra of solutions of the compound in $CDCl_3$ and $CD_3$-CO-$CD_3$ IR spectra of the solid (KBr-disc) and of a solution in chloroform confirmed that the compound as obtained was the dicyclohexylamine salt of 6-isothiocyanatopenicillanic acid.

Stability

The solid salt was fairly stable and in solutions in not too strongly polar aprotic solvents, the salt was fairly stable for at least some hours at room temperature. However, if the salt was dissolved in dimethylsulphoxide or dimethylformamide, rearrangement together with decomposition set in immediately. Also solutions of the salt in water or in aqueous buffer solutions were unstable at room temperature.

In an analogous manner, the new N-ethylpiperidine and cyclohexylamine salts of 6-isothiocyanaotopenicillanic acid were obtained by bringing together solutions of 6-isothiocyanatopenicillanic acid and N-ethylpiperidine and cyclohexylamine respectively. The structure and purity of these salts were determined with the aid of PMR- and IR-spectra or thin-layer chromatography.

EXAMPLE LII

Methyl Ester of 6-isothiocyanatopenicillanic acid 0.5 ml of water were added to a solution of 1.88 g of 6-isothiocyanatopenicillanic acid trimethylsilyl ester in 15 ml. of diethyl ether cooled to 0°C to effect hydrolysis of the ester and the solution was stirred for 30 minutes. A diazomethane solution (prepared from 2.14 g of N-methyl-N-nitroso-p-tolylsulphonamide in about 15 ml of diethyl ether) at 0°C was then added over a period of 15 minutes, during which development of gas was noticed. The reaction mixture was stirred for one hour at 0°C and left standing overnight at −18°C, whereafter it was poured into 80 ml of ice-water previously brought to a pH of 4. With stirring, the pH was raised to 7 and the layers formed were separated. After drying over magnesium sulfate, the ether layer is evaporated to dryness, leaving 1.50 gm of a solid which was almost pure according to thin-layer chromatography.

For preparing a colorless crystalline sample for analysis, the product was crystallized twice from a mixture of equal parts of diethyl ether and petroleum ether yielding 600 mg of pure methyl ester of 6-isothiocyanatopenicillanic acid which is new, having a melting point of 86°-87°C and a specific rotation $[\alpha]_D^{20°}$ = + 178.3° (c. = 1% in dichloromethane).

chloroform; concentration: about 10 mg./ml; values in cm$^{-1}$)

| N=C=S | C=O ($\beta$-lactam) | C=O (ester) |
|---|---|---|
| 2055 | 1790 | 1745 |

In an analogous manner, the new benzyl ester of 6-isothiocyanatopenicillanic acid was obtained by reaction of 6-isothiocyanatopenicillanic acid (prepared in situ from the trimethylsilyl ester) and phenyldiazomethane. The compound, as directly isolated from the reaction mixture, melted at 122°–127°C and was almost pure according to the thin-layer chromatogram and PMR spectrum.

EXAMPLE LIII

PREPARATION OF phenacyl ester of 6-isothiocyanatopenicillanic acid 1.7 g of trimethylsilyl ester of 6-isothiocyanatopenicillanic acid was added to a mixture of 30 ml. of acetone and 1 ml. of water at −5°C. After stirring for 10 minutes, the solvent was removed by evaporation under reduced pressure at 0°C and the remaining oil was dissolved in 10 ml of acetone. At 0°C and with stirring, a solution of 0.43 g. of sodium bicarbonate in 20 ml of water was added and when the evolution of carbon dioxide was finished, a solution of 1.04 g of phenacyl bromide in 10 ml of acetone at 0°C was added over a period of 15 minutes. The mixture was stirred at room temperature for 23 hours during which time a precipitate gradually formed. The mixture was concentrated to some extent under reduced pressure and the precipitate was filtered off, triturated with water, filtered and washed with some cold diethyl ether. After drying under reduced pressure, 1.4 g. of product were obtained which according to thin-layer chromatography and IR and PMR spectra was about 90–95% pure. Recrystallization from diethyl ether yielded pure, crystalline phenacyl ester of 6-isothiocyanatopenicillanic acid which is a new compound having a melting point of 110°–111°C and a specific rotation $[\alpha]_D^{20°}$ = + 153° (c. = 1% in dichloromethane). Partial analysis of the IR-spectrum (recorded in chloroform, concentration: about 10 mg/ml; values in cm$^{-1}$).

| Analysis: | $C_{10}H_{12}N_2O_3S_2$ | | | | | | | | |
|---|---|---|---|---|---|---|---|---|---|
| Calculated: | %C | 44.10 | %H | 4.44 | %N | 10.29 | %S: | 23.55 | %O | 17.62 |
| Found: | | 44.18 | | 4.47 | | 10.16 | | 23.52 | | 17.67 |

Analysis of the PMR spectra of methyl ester of 6-isothiocyanatopenicillanic acid (taken at 60 Mc: δ-values in ppm using tetramethylsilane as the internal standard) concentration: about 200 mg/ml.

N=C=S  C=O($\beta$-lactam) C=O ester C=O phenacyl C=C Aromatic
2058      1798              1758      1709          1599  1580
C—O—C ester
1170

| Solvent | CH$_3$ | OCH$_3$ | C$_2$-H | C$_3$-H and C$_6$H AB quartet J = 4.0 ± 0.2 cps | | | |
|---|---|---|---|---|---|---|---|
| CD$_3$COCD$_3$ | 1.51 | 1.70 | 3.83 | 4.70 | 5.57 | 5.63 | 5.76 | 5.83 |
| CDCl$_3$ | 1.51 | 1.71 | 3.81 | 4.58 | 5.13 | 5.20 | 5.58 | 5.65 |

Partial analysis of the IR-spectrum of 6-isothiocyanatopenicillanic acid methyl ester (recorded in Analysis of the PMR spectrum of a solution in CDCL$_3$ (taken at 60 Mc; δ-values in ppm using tetramethyl silane as internal standard):

| CH₃ | C₂H | C₅H and C₆-H AB quartet J = 4.0 + 0.2 cps | CH₂ (in ester group) | C₆H₅ |
|---|---|---|---|---|
| 1.72 1.79 | 4.71 | 5.11 5.18  5.58 5.65 | 5.47 5.50 | 7.4  8.2 |

The exterior lines of the AB quartet of small intensity attributed to the CH₂ group were not observed.

Analysis: $C_{17}H_{16}N_2O_3S_2$
Calculated: %C 54.23 %H 4.29 %N 7.44 %S 17.04 %O 17.00
Found:    54.41    4.33    7.45   16.98   16.83

EXAMPLE LIV

Preparation of Methyl Ester of 6-(N'-cyclohexyl-thioureido) penicillanic acid 110 mg of 6-isothiocyanatopenicillanic acid methyl ester in a glass tube as normally used for recording PMR-spectra was dissolved in 0.5 ml of $CD_3$—$CO$—$CD_3$. At 0°C, a PMR-spectrum was first recorded of this solution and its characteristics were given in Example LI. About 50 mg of cyclohexylamine (20% in excess) were then added immediately followed by a further recording of the spectrum again at 0°C and it appears that the methyl ester of 6-isothiocyanato(cis-5,6)-penicillanic acid was already completely converted into the new 6-(N'-cyclohexylthioureido)-(cis-5,6)-penicillanic acid methyl ester (about 85%) and a by-product (about 15%) which was the new methyl ester of 6-(N'-cyclohexyl-thioureido)-(trans-5,6)-penicillanic acid.

The reaction mixture was kept at 0°C for several hours in order to provide a possibility for the less stable trans isomer to gradually transform into one or more other compounds, possibly including the desired cis isomer. The slightly colored solution was then concentrated to a small volume causing a solid to precipitate, and by IR- and PMR-spectra and their interpretation, it was determined that methyl ester of 6-(N'-cyclohexylthioureido)-(cis-5,6)penicillanic acid with a purity of about 95% was obtained in good yield.

Partial analysis of the PMR spectrum of 6-(N'-cyclohexylthioureido)-(cis-5,6) penicillanic acid methyl ester at 0°C in $CD_3$—$CO$—$CD_3$ (taken at 60 Mc; δ-valves in ppm, using tetramethylsilane as the internal standard).

| CH₃ | OCH₃ | C₂-H | C₅-H doublet J = 4.3 ± 0.2 cps | C₆-H quartet J=4.3, J'=7.7±0.2 cps |
|---|---|---|---|---|
| 1.48 1.63 | 3.83 | 4.46 | 5.67 5.74 | 6.10 6.17  6.23 6.30 |

N-H (2 protons; 2 overlapping doublets J'≈J" = 7.7 cps) 7.40 → 7.63

EXAMPLE LV

Preparation of the cyclohexylamine salt of 6-(N'-cyclohexylthioureido)-(cis-5,6) penicillanic acid 140 mg. of cyclohexylamine were added to a solution at 0°C of 500 mg of 6-isothiocyanatopenicillanic acid (in the form of its cyclohexylamine salt) in 5 ml of anhydrous and purified acetone. The solution was stirred at room temperature for 3 hours and was then evaporated to dryness. The solid residue weighing 635mg was according to its IR- and PMR-spectra, the cyclohexylamine salt of new 6-(N'-cyclohexylthioureido) (cis-5,6) penicillanic acid in a purity of about 90%.

EXAMPLE LVI

Preparation of crystalline N-ethylpiperidine salt of 6-thioureido (cis-5,6) penicillanic acids Using the procedure of Example LV, amines were reacted rapidly with the N-ethylpiperidine salt of 6-isocyanatopenicillanic acid to obtain good yields of the corresponding N-ethylpiperidine salts of 6-thioureido-(cis-5,6)penicillanic acids in crystalline form.

| | Reagent | Final Product N-ethylpiperidine salt of: |
|---|---|---|
| 1 | 2-methoxyaniline | 6-[N'-(2-methoxy) phenyl-thioureido] penicillanic acid |
| 2 | benzylamine | 6-(N'-benzylthioureido)penicillanic acid |
| 3 | butylamine | 6-(N'-n-butylthioureido)penicillanic acid |
| 4 | cyclohexylamine | 6-(N'-cyclohexylthioureido) penicillanic acid |
| 5 | allylamine | 6-(N'-allylthioureido)penicillanic acid |
| 6 | 2,2-diethoxy-ethylamine | 6-[N'-(2,2-diethoxy)ethylthioureido] penicillanic acid |

The 6-thioureidopenicillin products specified above were at least 90% pure with the main impurities being a residual quantity of solvent and some N-ethylpiperidine. The penicillins prepared under (1), (2), (4) and (6) and also their salts are new compounds.

The IR spectra were recorded in chloroform and the concentration of the compounds amounted to about 10 mg/ml. Partial analysis of the IR-spectra gave the following results (in cm⁻¹).

| | NH | C=O(β-lactam) | S=O (carboxylate ion) |
|---|---|---|---|
| (1) | 3400 | 1775 | 1595 |
| (2) | 3400 3280 | 1770 | 1610 |

The PMR-spectra were recorded in $CDCL_3$ at 60 Mc.

Partial analysis of these spectra gave the following results: (δ-values in ppm using tetramethylsilane as the internal standard):

| | |
|---|---|
| CH₃ | (1) 1.57 and 1.60 (6 protons) |
|  | (2) 1.58 (6 protons) |
| C₂-H | (1) 4.33 |
|  | (2) 4.29 |
| C₅-H | (1) (doublet; J = 4.0 ± 0.2 cps); 5.69 and 5.76 |
|  | (2) (doublet; J = 4.0 ± 0.2 cps); 5.62 and 5.69 |
| C₆-H | (1) (multiplet): 6.07 |
|  | (2) (multiplet): 6.0 |
| O-CH₃ | (1) 3.87 |

-Continued

| | | |
|---|---|---|
| $C_6H_4$ | (1) (and N-H (multiplet; 6 protons)): 6.85 | 8.35 |
| | (2) 7.36 | |
| $CH_2$ | (2) (doublet): 4.71 and 4.80 | |
| $N-CH_2$ | (1) (multiplet, 6 protons): 2.80 | 3.30 |
| | (2) (multiplet, 6 protons): 2.65 | 3.25 |
| $CH_3$ (ethyl group) | (1) 1.30 (triplet) | |
| | (2) 1.25 (triplet) | |

EXAMPLE LVII

Preparation of methyl ester of 6-methoxythiocarbonamidopenicillanic acid

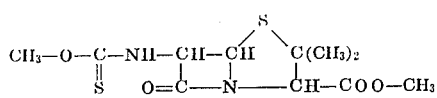

1 g. of the trimethylsilyl ester of 6-isothiocyanatopenicillanic acid was dissolved in 15 ml of pure distilled methanol under a nitrogen atmosphere and after about 15 mg of aluminum chloride were added thereto, the reaction mixture was heated to reflux. After about 1 ½ hours, another 15 mg of aluminum chloride was added and after 2 ½ hours, the reaction mixture was concentrated, and a crystalline precipitate was formed. The precipitate was filtered off, washed with methanol and dried. The filtrate was evaporated to dryness and the residue was treated with anhydrous diethyl ether. The precipitate was filtered off, washed with diethyl ether and dried to obtain a yield of combined precipitates of 375 mg of the methyl ester of 6-methoxythiocarbonamidopenicillanic acid melting at 128°–134°C identified by its IR and PMR spectra.

A mass spectral analysis showed a molecular weight of 304 (calculated 304). Analysis of PMR spectra of the final product dissolved in $CDCL_3$ and $(CD_3)_2SO$, respectively (60 Mc, δ-values in ppm, internal reference tetramethylsilane):

| | $CDCl_3$ | $(CD_3)_2SO$ |
|---|---|---|
| $C_3$-$CH_3$ | 1.52 and 1.63 | 1.45 and 1.55 |
| $O$-$CH_3$(2 x) | 3.83 and 3.87 | 3.77 and 3.79 |
| $C_6$ - H | 4.60, 4.66 (d,$J_1$=3.5) | 4.73, 4.76, 4.78, 4.80 |
| | | (q, $J_1$ = 2.7, $J_2$ = 1.3 cps) |
| $C_2$ - H | 5.24 | 5.12 |
| $C_5$ - H | 6.00, 6.06 (d,$J_1$=3.5) | 5.82, 5.87 (d, $J_1$=2.7 cps) |
| N - H | about 7.7 | about 10.0 (broadened singulet |

Partial analysis of the IR spectrum of the final product dissolved in chloroform (concentration about 10 mg/ml, values in $cm^{-1}$):

| | |
|---|---|
| 3346 | NH |
| 1755 | CO β-lactam |
| 1734 | CO ester |
| 1495 | Possibly NH def |

EXAMPLE LVIII

Preparation of 6-benzyloxythiocarbonamidopenicillanic acid

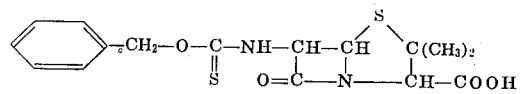

A mixture of 2 g. of the trimethylsilyl ester of 6-isothiocyanatopenicillanic acid, 15 ml of freshly distilled benzyl alcohol and about 15 mg of aluminum chloride was heated at 65°C for 5 minutes and the compound formed was separated in a yield of 150 mg of a solidified oil. IR and PMR spectra showed that 6-benzyloxythiocarbonamido-penicillanic acid was formed.

Analysis of the PMR spectrum of the final product dissolved in $CDCL_3$ (60 Mc, δ- values in ppm, internal reference tetramethylsilane):

| | |
|---|---|
| $C_3$ - $CH_3$ | about 1.65 (6 protons) |
| $C_6$ - H | 4.60, 4.66 (d, J = 3.6 cps, 1 proton) |
| $C_2$ - H | 5.22 (1 proton) |
| $CH_2$ | 5.26 (1 proton) |
| $C_5$ - H | 5.97, 6.03, (d, J = 3.6 cps. 1 proton) |
| $C_6H_5$ | About 7.4 (5 protons) |
| N - H | about 8.0 (broadened singulet, about 0.8 protons) |
| COOH (+ $H_2O$) | About 9.1 |

Partial analysis of the IR spectrum of the final product dissolved in chloroform (concentration about 10 mg/ml, values in $cm^{-1}$):

| | |
|---|---|
| about 3450 | NH |
| 1750 | C = O β-lactam |
| 1728 | C = O carboxyl |

EXAMPLE LIX

Preparation of 6-n-butoxythiocarbonamidopenicillanic acid

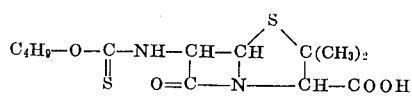

A mixture of 1 g of the trimethylsilyl ester of 6-isothiocyanatopenicillanic acid, 15 ml. of freshly distilled n-butanol and about 15 mg of aluminum chloride was heated for 20 minutes at 65°C. The reaction mixture was filtered, the filtrate evaporated to dryness and the residue was dissolved in a sodium bicarbonate solution. The solution was washed with diethyl ether, acidified and extracted with diethyl ether. The ether extract was used for recovery of the final product. IR and PMR spectra showed that 6-n-butoxythiocarbonamidopenicillanic acid was formed. Analysis of the PMR spectrum of the final product dissolved in $CDCL_3$ (60

Mc, δ-values in ppm, internal reference-tetramethylsilane):

| | |
|---|---|
| $CH_3CH_2CH_2$ | 0.8→2.0 } (13 protons) |
| $C_3$-$CH_3$ | 1.65 |
| O-$CH_2$ | 4.27 (center of a triplet, J = 6.5 cps, 2 protons) |
| $C_6$-H | 4.59, 4.65 (d, J=3.6 cps, 1 proton) |
| $C_2$-H | 5.21 |
| $C_5$-H | 5.94, 6.00 (d, J=3.6 cps, 1 proton) |
| N-H | 8.03 (broadened singulet, about 0.8 protons) |
| COOH (+$H_2O$) | about 10.2 |

EXAMPLE LX

Preparation of cyclohexyl ester of 6-cyclohexyloxythiocarbonamido-penicillanic acid

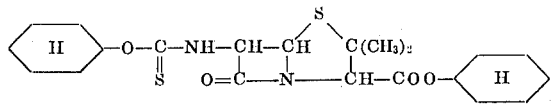

Using the procedure of Example LIX, 1 g. of the trimethylsilyl ester of 6-isothiocyanatopenicillanic acid and 15 ml. of cyclohexanol were reacted in the presence of about 15 mg of aluminum chloride at a temperature of 45°C. After about one hour, the reaction was substantially finished and the produce formed was separated to obtain a yield of about 500 mg of an oil which was the cyclohexyl ester of 6-cyclohexyloxythiocarbonamido-penicillanic acid according to IR and PMR spectra.

Analysis of the PMR spectrum of the final product dissolved in $CDCL_3$ (60 Mc, δ-values in ppm, internal reference tetramethylsilane):

| | |
|---|---|
| $(CH_2)_5$ | 0.9→2.3 } (26 protons) |
| $C_3$-$CH_3$ | 1.63 |
| O-CH(ester) | about 3.7 (undissolved multiplet, 1 proton) |
| $C_6$-H | 4.55, 4.61 (d,J=3.6 cps, 1 proton) |
| S=C-O-CH | about 4.9 (undissolved multiplet, 1 proton) |
| $C_2$-H | 5.19 (1 proton) |
| $C_5$-H | 5.95, 6.01, (d, J = 3.6 cps, 1 proton) |
| N-H | 8.00 (about 0.8 protons) |

EXAMPLE LXI

Preparation of 6-tert-butoxythiocarbonamido-penicillanic acid

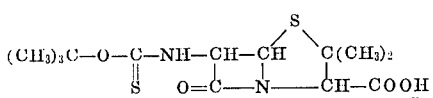

1 g. of the trimethylsilyl ester of 6-isothiocyanatopenicillanic acid and 15 ml. of freshly distilled tertbutanol were reacted in the presence of about 265 mg of aluminum chloride at 60°C and after about 5 minutes, the product formed was separated in a yield of about 150 mg in a crystalline form.

The final product was 6-tert.-butoxythiocarbonamido-penicillanic acid according to IR and PMR spectra. Analysis of the PMR spectrum of the final product dissolved in $CDCL_3$ (60 Mc, δ-values in ppm, internal reference tetramethylsilane):

| | |
|---|---|
| O-$C(CH_3)_3$ | 1.50 (9 protons) |
| $C_3$-$CH_3$ | 1.64 (6 protons) |

-Continued

| | |
|---|---|
| $C_6$-H | 4.48, 4.54 (d, J = 4.0, 1 proton) |
| $C_2$-H | 5.19 (1 proton) |
| $C_5$-H | 5.93, 5.99, (d, J = 4.0, 1 proton) |
| N-H | about 6.1 (1 proton) |
| COOH | about 6.7 (about 1 proton) |

EXAMPLE LXII

Preparation of methyl ester of 6--(methoxy-methylmercapto) methylideneiminopenicillanic acid

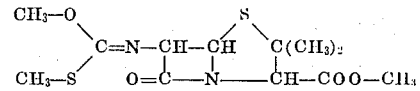

A diethyl ether solution of diazomethane (prepared from 1 g. of N-nitroso-N-methyl-p-tolylsulphonamide) was added to an ice-cold solution of 62 mg. of the methyl ester of 6-methoxythiocarbonamido-penicillanic acid in a mixture of 3 ml. of diethyl ether and 0.6 ml of dimethyl sulphoxide. After stirring the reaction mixture for 10 minutes at 0°C, the reaction mixture was kept overnight at ambient temperature. A thin-layer chromatogram showed an almost complete conversion of the 6-methoxythiocarbonamido-penicillanic acid ester. The diethyl ether was evaporated off completely and the resulting oil was submitted to column chromatography over silica using diethyl ether as eluent. The fractions containing the novel methylester of 6-(methoxymethylmercapto)-methylideneimino-penicillanic acid were collected and evaporated in vacuo to obtain a yield of 45 mg. of a slightly colored oil. An IR spectrum of the final product dissolved in chloroform showed the absence of an NH bond and the presence of two intensive, nearly coinciding absorptions at approximately 1750 cm⁻1 originating from carbonyl bonds, and an intensive absorption at 1570 cm⁻1 originating from the C = N bond. Analysis of the PMR spectrum of the final product dissolved in $CDCL_3$ (60 mc, δ-values in ppm, internal reference tetramethylsilane):

| | |
|---|---|
| $C_3$-$CH_3$ | 1.47, 1.56 (6 protons) |
| S-$CH_3$ | 2.57 (3 protons) |
| O-$CH_3$ | 3.80 (coinciding absorptions, 6 protons) |
| $C_2$-H | 4.51 (1 proton) |
| $C_6$-H or $C_5$-H | 4.86, 4.92 (d, J = 3.5 cps, 1 proton) |
| $C_5$-H or $C_6$-H | 5.87, 5.93 (d, J = 3.5 cps 1 proton) |

The novel penicillins of general formula VII, VIII and IX can be formulated into pharmaceutical compositions having, for example, the following formulations.

---

1. Penicillins in the form of free acids insoluble in water.

(a) Syrup (suspension)

| | |
|---|---|
| penicillin compound | 1.5 – 6 g. |
| soluble starch | 1 – 3 g. |
| sodium saccharinate | 0.1 – 1 g. |
| Nipa M(methyl p-hydroxybenzoate) | 0.06 g. |
| saccharose | 30 g. |
| flavouring agent and dye-stuff | q.s. |
| water sufficient to make up to | 60 ml. |

(b) Capsules

43
-Continued

| 1. Penicillins in the form of free acids insoluble in water. | | |
|---|---|---|
| penicillin compound | | 250–500 mg. |
| talc | | 20–100 mg. |
| magnesium stearate | | 2–10 mg. |
| lactose | q.s. for 1 capsule | |
| (c) Tablets | | |
| penicillin compound | | 250–500 mg. |
| polyvinylpyrrolidone | | 5–30 mg. |
| amylum maidis | | 100–300 mg. |
| magnesium stearate | | 1–20 mg. |
| lactose | q.s. for 1 tablet | |
| 2. Penicillins soluble in water (in the form of sodium salt) | | |
| (a) Syrup | | |
| penicillin compound sodium | | 1.5–6 g. |
| carboxymethylcellulose | | 0.06–0.600 g. |
| sodium saccharinate | | 0.1–1 g. |
| Nipa -M | | 0.06 g. |
| saccharose | | 30 g. |
| flavouring agent and dye-stuff | q.s. | |
| water sufficient to make up to | | 60 ml. |
| (b) Injectable liquid | | |
| penicillin compound | | 100–2000 mg. |

A suitable amount of sterile powder is aseptically inserted in a vial. Before use the powder is dissolved in a suitable amount of sterile and pyrogen free water.

(c) Capsules and (d) Tablets can be formulated with similar ingredients of those indicated above for insoluble penicillins.

EXAMPLE LXIII

Experiment for testing the microbiological activity of some thiopenicillins.

In this experiment there was tried to discover a possible inhibiting action upon administration of the compounds to growing bacteria-cultures. This was done by measuring the shape of growth-curves. As test organisms, *Staphylococcus aureus* A 55 and *Proteus mirabilis* L 93, respectively a Grampositive and Gram-negative organism, were selected. From both those testorganisms growth-curves were measured by means of a nephelometer. The following penicillins were tested: (A) The N-ethyl-piperidine salt of 6-N'-(2,2-diethoxy)ethylthioureido penicillanic acid, (B) 6- methoxythiocarbonamido-penicillanic acid methyl-ester, (C) 6-benzyloxythiocarbonamido-penicillanic acid. The antibiotic was added in a predetermined concentration when the testorganism was in the so called "logarithmical growth-state".

By the growth-curves was demonstrated that Staphylococcus aureus A 55 was strongly inhibited by the compound indicated by A in concentrations from 3 ug/ml.

*Proteus mirabilis* L93 was inhibited by the compounds (B) and (C) in a concentration of > 50 ug/ml.

Various modifications of the products and methods of the invention may be made without departing from the spirit or scope thereof and it is to be understood that the invention is to be limited only as defined in the appended claims.

We claim:

1. A process for the preparation of 6-isocyanatopenicillanic acid compounds of claim 18 having the formula

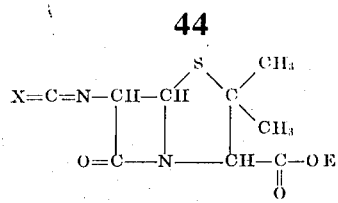

wherein X is oxygen and E is selected from the group consisting of a silyl, optionally halo-substituted phenacyl, benzyl and benzhydryl consisting essentially of reacting phosgene with a penicillanic acid derivative of the formula

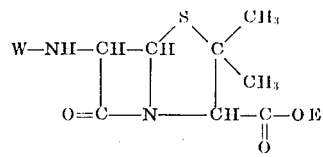

wherein W is selected from the group consisting of hydrogen and $(R)_3Si-$ where R is selected from the group consisting of lower alkyl, phenyl and phenyl lower alkyl and E is as defined above in an inert organic medium to convert the group W-NH- into an isocyanato group without affecting the rest of the molecule.

2. Process of claim 1 wherein the reaction is carried out at a temperature at or below $-20°C$.

3. Process of claim 1 wherein the reaction is carried out in the presence of a tertiary amine to bind the hydrogen chloride formed.

4. Process of claim 3 wherein the hydrochloride of the tertiary amine is insoluble in said organic medium.

5. Process of claim 1 wherein the inert organic medium is dichloromethane optionally mixed with toluene.

6. Process of claim 1 wherein the inert organic medium is toluene optionally mixed with dichloromethane.

7. Process of claim 1 wherein W and E are trimethylsilyl.

8. Process of claim 4 wherein the tertiary amine is triethyl amine or N-ethyl piperidine.

9. A penicillanic acid compound of the formula

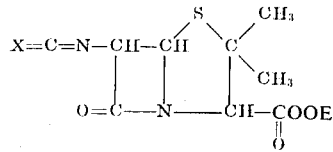

wherein X is oxygen and E is selected from the group consisting of a silyl, optionally halo substituted phenacyl, benzyl and benzhydryl.

10. A compound of claim 9 which is trimethylsilyl 6-isocyanatopenicillanate.

11. A compound of claim 9 which is phenacyl 6-isocyanatopenicillinate.

12. A compound of claim 9 which is benzylester of 6-isocyanatopenicillanic acid.

13. A compound of claim 9 which is benzhydrylester of 6-isocyanatopenicillanic acid.

14. The process of claim 1 wherein the reaction is carried out at a temperature at or below $-40°C$.

* * * * *

UNITED STATES PATENT OFFICE
CERTIFICATE OF CORRECTION

Patent No. 3,870,705     Dated March 11, 1975

Inventor(s) PETER WOLFGANG HENNIGER and PETER MAX SMID

It is certified that error appears in the above-identified patent and that said Letters Patent are hereby corrected as shown below:

| Patent Col. | Line | Appln. Page | Line | |
|---|---|---|---|---|
| IN [73] | | | | "Spiritusfabried N.V., Delft, Netherlands" should be --Spiritusfabriek, N.V., Delft, Netherlands-- |

IN [30] add the following

June 18, 1968 Netherlands --68.08622--

December 18, 1969 Great Britain --61843/69--

| | | | | |
|---|---|---|---|---|
| 2 | 2 | 2 | 23 | "isothiocyanatogroup" should be --isothiocyanato group-- |
| 2 | 9 | 3 | 1&2 | "(substitutedamino)" should be --(substituted amino)-- |
| 10 | 29 | 18 | 6 | "$R_{12}$, $R_{13}$, $R_{14}$" should be --$R_{12}$, $R_{13}$ and $R_{14}$-- |

UNITED STATES PATENT OFFICE
CERTIFICATE OF CORRECTION

Patent No. 3,870,705            Dated March 11, 1975

Inventor(s) PETER WOLFGANG HENNIGER and PETER MAX SMID

It is certified that error appears in the above-identified patent and that said Letters Patent are hereby corrected as shown below:

| Patent | | Appln. | | |
|---|---|---|---|---|
| Col. | Line | Page | Line | |
| 10 | 47 | 18 | 22&23 | "ingedient" should be --ingredient-- |
| 15 | 65 | 27 | 27 | "α-penicillin" should be --α-cyanobenzyl penicillin-- |
| 16 | 32 | 28 | 32 | "C H" should be -- $C_\alpha H$ -- |
| 16 | 33 | 29 | 1 | "7.2 Σ 7.5" should be --7.2 → 7.5-- |
| 22 | 53 | 41 | 3&4 | "6isocyantopeni" should be --6-isocyantopenic-- |
| 23 | 25 | 42 | 9 | "[2-ethoxy)naphthyl]" should be --[(2-ethoxy)-naphthyl]-- |
| 25 | 47 | 46 | 30 | "ε-[N" should be --6-[N-- |
| 27 | 19 | 50 | 3 | "2α" should be --2γ-- |
| 34 | 65 | 65 | 12 | "$CD_3$-CO-$CD_3$ 1R" should be --$CD_3$, CO-$CD_3$ and 1R-- |

UNITED STATES PATENT OFFICE
CERTIFICATE OF CORRECTION

Page 3 of 3

Patent No. 3,870,705  Dated March 11, 1975

Inventor(s) PETER WOLFGANG HENNIGER and PETER MAX SMID

It is certified that error appears in the above-identified patent and that said Letters Patent are hereby corrected as shown below:

| Patent | | Appln. | | |
|---|---|---|---|---|
| Col. | Line | Page | Line | |
| 37 | Last Col. | 68 | 25 | "7.4 8.2" should be --7.4   8.2-- |
| 39 | 1 | 72 | 6 | "6.85 8.35" should be --6.85   8.35-- |
| " | 7 | 72 | 9 | "2.80 3.30" should be --2.80   3.30-- |
| 39 | 8 | 72 | 10 | "2.65  3.25" should be --2.65   3.25-- |
| 39 | 41 | 73 | 4 | "CDCL$_3$" should be --CDCl$_3$-- |
| 40 | 14 | 74 | 6 | "  "  "  "  "  "  "  "  "  "  "  "  " |
| 40 | 67 | 75 | 12 | "  "  "  "  "  "  "  "  "  "  "  "  " |
| 41 | 27 | 76 | 6 | "produce" should be --product-- |
| 41 | 33 | 76 | 11 | "CDCL$_3$ should be --CDCl$_3$-- |
| 41 | 63 | 77 | 4 | "  "  "  "  "  "  "  "  "  "  "  "  " |
| 42 | 42 | 78 | 12 | "  "  "  "  "  "  "  "  "  "  "  "  " |
| 43 | 66 | Cancel "of claim 18" | | |

Signed and Sealed this thirtieth Day of December 1975

[SEAL]

Attest:

RUTH C. MASON
Attesting Officer

C. MARSHALL DANN
Commissioner of Patents and Trademarks